US009369710B2

(12) United States Patent
Chen et al.

(10) Patent No.: US 9,369,710 B2
(45) Date of Patent: Jun. 14, 2016

(54) REFERENCE PICTURE LIST MODIFICATION FOR VIDEO CODING

(71) Applicant: Qualcomm Incorporated, San Diego, CA (US)

(72) Inventors: Ying Chen, San Diego, CA (US); Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 13/759,905

(22) Filed: Feb. 5, 2013

(65) Prior Publication Data
US 2013/0202035 A1  Aug. 8, 2013

Related U.S. Application Data

(60) Provisional application No. 61/595,659, filed on Feb. 6, 2012, provisional application No. 61/596,158, filed on Feb. 7, 2012, provisional application No. 61/598,780, filed on Feb. 14, 2012, provisional application No. 61/625,050, filed on Apr. 16, 2012.

(51) Int. Cl.
H04N 7/26       (2006.01)
H04N 13/00      (2006.01)
H04N 19/61      (2014.01)
(Continued)

(52) U.S. Cl.
CPC ....... H04N 19/00781 (2013.01); H04N 19/105 (2014.11); H04N 19/172 (2014.11); H04N 19/174 (2014.11); H04N 19/46 (2014.11); H04N 19/573 (2014.11); H04N 19/70 (2014.11)

(58) Field of Classification Search
CPC .......... H04N 19/00781; H04N 19/105; H04N 19/70; H04N 19/573; H04N 19/46; H04N 19/174; H04N 19/172
USPC ...................................... 375/240.12
See application file for complete search history.

(56) References Cited

U.S. PATENT DOCUMENTS

2006/0083298 A1    4/2006   Wang et al.
2009/0238269 A1    9/2009   Pandit et al.
(Continued)

FOREIGN PATENT DOCUMENTS

WO        2013002700 A1     1/2013

OTHER PUBLICATIONS

Hannuksela et al. "AHG21: Removal of Reference Picture List Modification", JCT-VC 8th Meeting: San Jose, CA, USA, Feb. 1-10, 2012.*

(Continued)

Primary Examiner — Hee-Yong Kim
(74) Attorney, Agent, or Firm — Shumaker & Sieffert, P.A.

(57) ABSTRACT

A video coder may, in some cases, signal whether one or more initial reference picture lists are to be modified. When an initial list is to be modified, the video coder can signal information indicating a starting position in the initial reference picture list. When the starting position signaled by the video coder is less than a number of pictures included in the initial reference picture list, then the video coder signals the number of pictures to be inserted into the initial reference picture list, and a reference picture source from which a picture can be retrieved to insert into the initial reference picture list to construct a modified reference picture list.

25 Claims, 6 Drawing Sheets

(51) Int. Cl.
*H04N 19/105* (2014.01)
*H04N 19/70* (2014.01)
*H04N 19/172* (2014.01)
*H04N 19/46* (2014.01)
*H04N 19/174* (2014.01)
*H04N 19/573* (2014.01)

(56) References Cited

U.S. PATENT DOCUMENTS

| 2012/0069903 | A1 | 3/2012 | Lim et al. | |
|---|---|---|---|---|
| 2012/0229602 | A1* | 9/2012 | Chen et al. | 348/43 |
| 2013/0003827 | A1 | 1/2013 | Misra et al. | |
| 2013/0215975 | A1* | 8/2013 | Samuelsson et al. | 375/240.25 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.
International Preliminary Report on Patentability—PCT/US20131024937, The International Bureau of WIPO—Geneva, Switzerland, 2014-08-21, 12 pp.
Wang, et al., "AHG21: On DPB management", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G314, XP030110298, 7 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Bross, B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-11003_d2, XP030112373, (May 10, 2012), 290 pages.
Bross, B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pages.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen, Y., et al., "3D-HEVC HLS: reference picture list modification", 100. MPEG Meeting; Apr. 30, 2012-May 4, 2012; Geneva; (Motion Picture Expert Group or ISO/IEC JTC1 /SC29/WG11 ), No. m24944, Apr. 25, 2012, XP030053287, 9 pages.
Hannuksela M. M. et al., "AHG21: On reference picture list construction and reference picture marking", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G643, Nov. 8, 2011, XP030110627, 10 pages.

International Search Report and Written Opinion—PCT/US2013/024937—ISA/EPO—May 13, 2013.
Ramasubramonian, A.K., et al., "AHG15: On reference picture list modification", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-TSG.16 ); URL: http://wftp3.itu.int/av-arch/jctvc-site/, No. JCTVC-10348, Apr. 17, 2012, XP030112111, 4 pages.
Sjoberg R., et al., "Overview of HEVC High-Level Syntax and Reference Picture Management," IEEE Transactions on Circuits and Systems for Video Technology, vol. 22 (12), XP011487804, Dec. 2012, pp. 1858-1870.
Wahadaniah V. et al., "AHG21: Construction and modification of predefined reference picture sets and reference picture lists", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G548, Nov. 8, 2011, XP030110532, 21 pages.
Wang Y-K et al., "AHG21: On DPB management", 98. MPEG Meeting; Nov. 28, 2011-Dec. 2, 2011; Geneva; (Motion Picture Expert Group or ISO/IEC JTC1/SC29/WG11), No. m21876, JCTVC-G314, Nov. 23, 2011, XP030050439, 7 pages.
Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegui [retrieved on Jul. 11, 2012], 153 pages.
Wiegand, T., et al., "WD3: Working Draft 3 of High-Efficiency Video Coding," Document JCTVC-E603, 5th Meeting: Geneva, CH, Mar. 16-23, 2011, 193 pages.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pages.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Chen et al., "3D-HEVC HLS: reference picture list modification," ISO/IEC JTC1/SC29/WG11, MPEG2012/m24944, Geneva, Switzerland, Apr.-May 2012, 9 pp.
Hannuksela et al., "AHG21: On reference picture list construction and reference picture marking," Document JCTVC-G643, 7th Meeting: Geneva, CH, Nov. 21-30, 2011, 10 pp.
Hannuksela et al., "AHG21: Removal of reference picture list modification," Document JCTVC-H0426, 8th Meeting: San Jose, CA, Feb. 1-10, 2012, 10 pp.
International Search Report and Written Opinion—PCT/US2013/024937—ISA/EPO—May 13, 2013, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

(56) References Cited

OTHER PUBLICATIONS

Ramasubramonian et al., "On reference picture list modification," Document JCTVC-I0348, 9th Meeting: Geneva, CH, Apr. 27-May 7, 2012, 4 pp.

Sjoberg et al., "Overview of HEVC High-Level Syntax and Reference Picture Management," IEEE Transactions on circuits and Systems for Video Technology, vol. 22 (12), Dec. 2012, pp. 1858-1870.

Wahadaniah et al., "AHG21: Construction and modification of pre-defined reference picture sets and reference picture lists," Document JCTVC-G548, 7th Meeting: Geneva, CH, Nov. 21-30, 2011, 21 pp.

Wang et al., "AHG21: On DPB management," Document JCTVC-G314, 7th Meeting: Geneva, CH, Nov. 21-30, 2011, 7 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

\* cited by examiner

REFERENCE PICTURE LIST MODIFICATION FOR VIDEO CODING

REFERENCE PICTURE LIST MODIFICATION FOR VIDEO CODING

This application claims the benefit of: U.S. Provisional Application No. 61/595,659, filed Feb. 6, 2012; U.S. Provisional Patent Application No. 61/596,158, filed Feb. 7, 2012; U.S. Provisional Patent Application No. 61/598,780, filed Feb. 14, 2012, and U.S. Provisional Patent Application No. 61/625,050, filed Apr. 16, 2012, the entire contents of each of which is incorporated by reference in its entirety.

TECHNICAL FIELD

This disclosure relates to video coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to reference picture list modification. Reference picture lists are employed to inter-predicted pictures or portions thereof in the process of coding pictures in video data. In some cases, a reference picture list is initially constructed and then the initial list is modified before use in coding a picture or portion of a picture.

A video encoder may, in some cases, signal whether one or more initial reference picture lists are to be modified in the process of decoding a current picture. In accordance with this disclosure, when an initial list is to be modified, the video encoder can signal information in a coded bitstream that indicates a starting position in the initial reference picture list. When the starting position signaled in the coded bitstream is less than a number of pictures included in the initial reference picture list, then the video encoder also signals in the coded bitstream the number of pictures to be inserted into the initial reference picture list, and a reference picture source from which a picture can be retrieved to insert into the initial reference picture list to construct a modified reference picture list.

In some examples, the video encoder does not expressly signal information indicating a starting position in the initial reference picture list. The video encoder can, however, signal the number of pictures to be inserted into the initial reference picture list. Additionally, the video encoder can optionally signal a selected reference picture superset and indexes into the selected reference picture superset from which pictures can be retrieved to insert into the initial reference picture list to construct the modified reference picture list. In cases where the list modification starting position is not expressly signaled, the video decoder can infer that the starting position for list modification is the first index position in the initial reference picture list, e.g., index 0, and then insert the signaled number of pictures to be inserted into the initial list starting at index 0 to construct the modified reference picture list.

In one example according to this disclosure, a method for encoding video data includes coding information indicating a number of pictures to be inserted into an initial reference picture list to construct a modified reference picture list.

In another example, a method for decoding video data includes determining a number of pictures to be inserted into an initial reference picture list to construct a modified reference picture list based on a coded syntax element and inserting the number of pictures into the initial reference picture list to construct the modified reference picture list.

In another example, a video encoding device includes a video encoder configured to coding information indicating a number of pictures to be inserted into an initial reference picture list to construct a modified reference picture list.

In another example, a video decoding device a video decoder configured to determine a number of pictures to be inserted into an initial reference picture list to construct a modified reference picture list based on a coded syntax element, and insert the number of pictures into the initial reference picture list to construct the modified reference picture list.

In another example, a video encoding device including means for coding information indicating a number of pictures to be inserted into an initial reference picture list to construct a modified reference picture list.

In another example, a video decoding device includes means for determining a number of pictures to be inserted into an initial reference picture list to construct a modified reference picture list based on a coded syntax element and means for inserting the number of pictures into the initial reference picture list to construct the modified reference picture list.

In another example, a computer-readable storage medium has stored thereon instructions that when executed cause one or more processors to perform operations including coding information indicating a number of pictures to be inserted into an initial reference picture list to construct a modified reference picture list.

In another example, a computer-readable storage medium has stored thereon instructions that when executed cause one or more processors to perform operations including determining a number of pictures to be inserted into an initial reference picture list to construct a modified reference picture list based on a coded syntax element and inserting the number of pictures into the initial reference picture list to construct the modified reference picture list.

In another example, a method for encoding video data includes coding information indicating a starting position in an initial reference picture list constructed based on a reference picture set. The reference picture set identifies reference pictures that can be used for inter-predicting one or more pictures included in the video data. The method also includes, when the starting position is less than a number of pictures included in the initial reference picture list: coding information indicating a number of pictures to be inserted into the initial reference picture list; and coding information indicating a selected reference picture superset and an index into the selected reference picture superset from which a picture can be retrieved to insert into the initial reference picture list to construct a modified reference picture list. The selected reference picture superset comprises one or more subsets of the reference picture set.

In another example, a method for decoding video data includes setting a current index into an initial reference picture list based on a coded starting position indicating a position at which to begin modification of the initial reference picture list. The initial reference picture list is constructed based on a reference picture set. The reference picture set identifies reference pictures that can be used for inter-predicting one or more pictures included in the video data. The method also includes identifying a reference picture in a selected reference picture superset using an index into the selected reference picture superset, and associating the identified reference picture with the current index of the initial reference picture list to construct the modified reference picture list. The selected reference picture superset comprises one or more subsets of the reference picture set.

In another example, a video encoding device includes a video encoder configured to code information indicating a starting position in an initial reference picture list constructed based on a reference picture set. The reference picture set identifies reference pictures that can be used for inter-predicting one or more pictures included in video data. The video encoder is also configured to, when the starting position is less than a number of pictures included in the initial reference picture list: code information indicating a number of pictures to be inserted into the initial reference picture list; and code information indicating a selected reference picture superset and an index into the selected reference picture superset from which a picture can be retrieved to insert into the initial reference picture list to construct a modified reference picture list. The selected reference picture superset comprises one or more subsets of the reference picture set.

In another example, a video decoding device includes a video decoder configured to set a current index into an initial reference picture list based on a coded starting position indicating a position at which to begin modification of the initial reference picture list. The initial reference picture list is constructed based on a reference picture set. The reference picture set identifies reference pictures that can be used for inter-predicting one or more pictures included in video data. The video decoding device is also configured to identify a reference picture in a selected reference picture superset using an index into the selected reference picture superset, and associate the identified reference picture with the current index of the initial reference picture list to construct the modified reference picture list. The selected reference picture superset comprises one or more subsets of the reference picture set.

In another example, a video encoding device includes means for coding information indicating a starting position in an initial reference picture list constructed based on a reference picture set. The reference picture set identifies reference pictures that can be used for inter-predicting one or more pictures included in video data. The video encoding device also includes, when the starting position is less than a number of pictures included in the initial reference picture list: means for coding information indicating a number of pictures to be inserted into the initial reference picture list; and means for coding information indicating a selected reference picture superset and an index into the selected reference picture superset from which a picture can be retrieved to insert into the initial reference picture list to construct a modified reference picture list. The selected reference picture superset comprises one or more subsets of the reference picture set.

In another example, a video decoding device includes means for setting a current index into an initial reference picture list based on a coded starting position indicating a position at which to begin modification of the initial reference picture list. The initial reference picture list is constructed based on a reference picture set. The reference picture set identifies reference pictures that can be used for inter-predicting one or more pictures included in video data. The decoding device also includes means for identifying a reference picture in a selected reference picture superset using an index into the selected reference picture superset, and means for associating the identified reference picture with the current index of the initial reference picture list to construct the modified reference picture list. The selected reference picture superset comprises one or more subsets of the reference picture set.

In another example, a computer-readable storage medium having stored thereon instructions that when executed cause one or more processors to perform operations including coding information indicating a starting position in an initial reference picture list constructed based on a reference picture set, when the starting position is less than a number of pictures included in the initial reference picture list: coding information indicating a number of pictures to be inserted into the initial reference picture list; and coding information indicating a selected reference picture superset and an index into the selected reference picture superset from which a picture can be retrieved to insert into the initial reference picture list to construct a modified reference picture list. The reference picture set identifies reference pictures that can be used for inter-predicting one or more pictures included in video data. The selected reference picture superset comprises one or more subsets of the reference picture set.

In another example, a computer-readable storage medium having stored thereon instructions that when executed cause one or more processors to perform operations including setting a current index into an initial reference picture list based on a coded starting position indicating a position at which to begin modification of the initial reference picture list, identifying a reference picture in a selected reference picture superset using an index into the selected reference picture superset, and associating the identified reference picture with the current index of the initial reference picture list to construct the modified reference picture list. The initial reference picture list is constructed based on a reference picture set. The reference picture set identifies reference pictures that can be used for inter-predicting one or more pictures included in video data. The selected reference picture superset comprises one or more subsets of the reference picture set.

In another example, a method for encoding video data includes coding information indicating a starting position in an initial reference picture list constructed based on a reference picture set, when the starting position is less than a number of pictures included in the initial reference picture list: coding information indicating a number of pictures to be inserted into the initial reference picture list; and coding information indicating a reference picture source from which a picture can be retrieved to insert into the initial reference picture list to construct a modified reference picture list. The reference picture set identifies reference pictures that can be used for inter-predicting one or more pictures included in the video data.

The details of one or more examples are set forth in the accompanying drawings and the description below. Other features, objects, and advantages will be apparent from the description and drawings, and from the claims.

DETAILED DESCRIPTION

Figure 1:
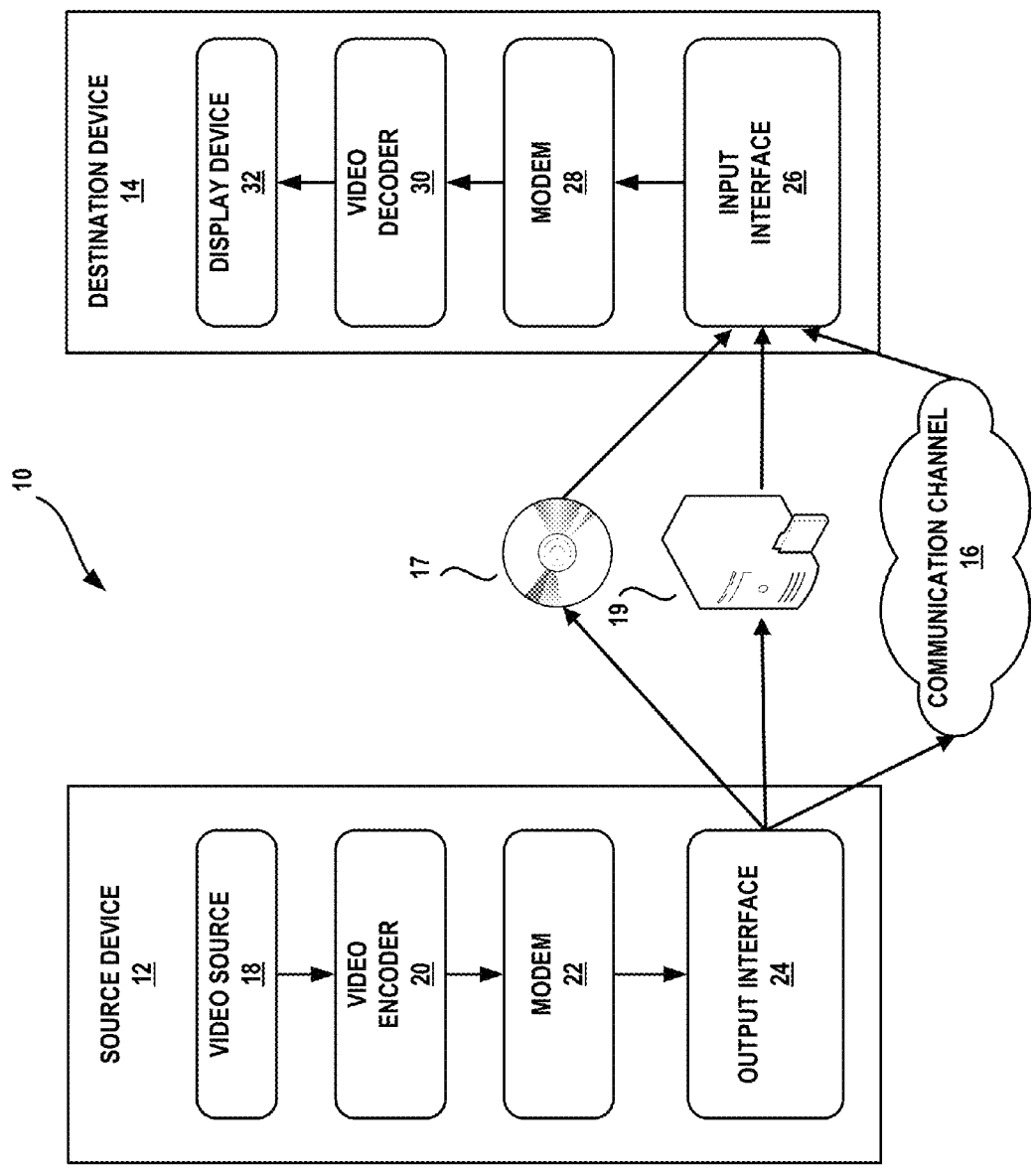
FIG. 1 is a block diagram illustrating an example video encoding and decoding system that may utilize techniques described in this disclosure.

The techniques described are related to the construction and modification of reference picture lists, which are used for inter-prediction. In this disclosure, an initial reference picture list is modified by inserting one or more reference pictures into the initial list beginning at a particular starting position. The starting position in the initial reference picture list or lists may be a signaled syntax element within a coded bitstream that specifies from where the reference picture list modification is to begin. Examples of this disclosure also include signaling the number of pictures that are to be inserted into the initial list to construct the modified reference picture list. In some cases, the starting position may not be explicitly signaled, in which case the starting position for list modification can be inferred to be the first index position in the reference picture list, e.g., index 0. The foregoing and other examples described below include mechanisms for improving the efficiency of reference picture list modification signaling and execution as part of the process of coding video data.

A video coder (e.g., a video encoder or a video decoder) can include a decoded picture buffer (DPB). The DPB stores decoded pictures, including reference pictures. Reference pictures are pictures that can potentially be used for inter-predicting a picture. In other words, the video coder may predict a picture or portion thereof, during coding (encoding or decoding) of that picture, based on one or more reference pictures stored in the DPB.

To efficiently utilize the DPB, the DPB management process may be specified, such as the storage process of decoded pictures in the DPB, the marking process of the reference pictures, the output and removal process of the decoded pictures from the DPB, and so forth. In general, in some current and developing video coding standards, the DPB management may also include reference picture list initialization and modification.

For example, a video coder may be tasked with constructing reference picture lists that indicate which reference pictures may be used for inter-prediction purposes. Two of these reference picture lists are referred to as List 0 and List 1, respectively. The video coder firstly employs default construction techniques to construct List 0 and List 1 (e.g., pre-configured construction schemes for constructing List 0 and List 1). Optionally, after the initial List 0 and List 1 are constructed, the video decoder may decode syntax elements, when present, that instruct the video decoder to modify the initial List 0 and List 1.

The video encoder may signal syntax elements that are indicative of identifier(s) of reference pictures in the DPB, and the video encoder may also signal syntax elements that include indices, within List 0, List 1, or both List 0 and List 1, that indicate which reference picture or pictures to use to decode a coded block of a current picture. The video decoder, in turn, uses the received identifier to identify the index value or values for a reference picture or reference pictures listed in List 0, List 1, or both List 0 and List 1. From the index value(s) as well as the identifier(s) of the reference picture or reference pictures, the video decoder retrieves the reference picture or reference pictures, or part(s) thereof, from the DPB, and decodes the coded block of the current picture based on the retrieved reference picture or pictures and one or more motion vectors that identify blocks within the reference picture or pictures that are used for decoding the coded block.

Reference picture list management executed by a video coder can include at least two steps, initialization to generate initial reference picture list(s) and modification (also sometimes referred to as reference picture list reordering) to generate modified reference picture list(s) from the initial list(s). Reference picture list initialization may be an implicit mechanism that puts the reference pictures in the reference picture memory (also known as decoded picture buffer) into a list based on the order of POC (Picture Order Count, aligned with display order of a picture) values. Reference picture list modification may modify the position of a picture that was put in the list during the reference picture list initialization to any new position, or put any reference picture in the reference picture memory in any position even if the picture does not belong to the initialized list. Some pictures after the reference picture list modification, may be put in a very further position in the list. However, if a position of a picture exceeds the number of active reference pictures of the list, the picture is not considered as an entry of the final reference picture list. The number of active reference pictures may be signaled in the slice header for each list.

The techniques described in this disclosure may be applicable to various video coding standards. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques are described in context of the HEVC standard. A recent Working Draft (WD) of HEVC, and referred to as HEVC WD10 hereinafter, is available, as of Jan. 25, 2013, from http://phenix.int-evry.fr/jct/doc_end_user/documents/12_Geneva/wg11/JCTVC-L1003-v9.zip.

In some cases, reference picture lists are constructed from a reference picture set. A reference picture set is defined as a set of reference pictures associated with a picture, consisting of all reference pictures that are prior to the associated picture in decoding order, that may be used for inter prediction of blocks in the associated picture or any picture following the associated picture in decoding order, for example, until the next instantaneous decoding refresh (IDR) picture, or broken link access (BLA) picture. In other words, reference pictures in the reference picture set may require the following characteristics: (1) they are all prior to the current picture in decoding order, and (2) they may be used for inter-predicting the current picture and/or inter-predicting any picture following the current picture in decoding order, and in some examples, until the next IDR picture or BLA picture. There may be other alternate definitions of the reference picture set, which are provided below.

The reference picture set may be constructed in a number of ways. In one example, a video coder may derive the reference picture set, and after such derivation, the video coder may construct the reference picture lists. For instance, only reference pictures in the reference picture set may be candidate reference pictures that are used to construct the reference picture lists.

To construct the reference picture set, the video coder may construct a plurality of reference picture subsets. The combination of the reference picture subsets may together form the reference picture set. For example, a video encoder may explicitly signal, in a coded bitstream, values that allow a video decoder to determine identifiers for the reference pictures that are included in the reference picture set. For instance, the identifiers of the reference pictures may be the picture order counts. Each picture is associated with one picture order count, referred to as PicOrderCnt. PicOrderCnt indicates the output order or display order of the corresponding picture relative to the previous IDR picture in decoding order, and, in some other alternatives, indicates the position of the associated picture in output order relative to the output order positions of the other pictures in the same coded video sequence.

The PicOrderCnt may be referred to as a picture order count (POC) value. A POC value may indicate the output or display order of a picture, and may be used to identify a picture. For example, within a coded video sequence, a picture with a smaller POC value is outputted or displayed earlier than a picture with larger POC value.

The video decoder may determine the identifiers for the reference pictures, and from these identifiers construct the plurality of reference picture subsets. From these reference picture subsets, the video decoder may derive the reference picture set, as described in more detail below. In some examples, each of the reference picture subsets include different reference pictures, in that there is no overlap of reference pictures in the reference picture subsets. In this way, each of the reference pictures may be in only one of the reference picture subsets, and in no other reference picture subset. However, aspects of this disclosure should not be considered so limited.

After determining the identifiers (e.g., POC values) of the reference pictures in the reference picture set or its subsets, the video decoder may construct the reference picture subsets. As described in more detail below, the video decoder may construct six reference picture subsets, although it may be possible for the video decoder to construct more or fewer reference picture subsets.

These six reference picture subsets are named: RefPicSetStCurr0, RefPicSetStCurr1, RefPicSetStFoll0, RefPicSetStFoll1, RefPicSetLtCurr, and RefPicSetLtFoll. The RefPicSetStCurr0 reference picture subset may be referred to as the RefPicSetStCurrBefore reference picture subset, and the RefPicSetStCurr1 reference picture subset maybe referred to as the RefPicSetStCurrAfter reference picture subset.

The RefPicSetStCurr0, RefPicSetStCurr1, RefPicSetStFoll0, and RefPicSetStFoll1 reference picture subsets may identify short-term reference pictures. In some examples, these reference picture subsets may identify short-term reference pictures based on whether the short-term reference pictures are earlier in display order or later in display order than the current picture being coded, as well as whether the short-term reference pictures can potentially be used for inter-predicting the current picture and pictures following the current picture in decoding order, or can potentially be used for inter-predicting only the pictures following the current picture in decoding order.

The RefPicSetLtCurr and the RefPicSetLtFoll reference picture subsets may identify long-term reference pictures. In some examples, these reference picture subsets may identify long-term reference pictures based on whether the long-term reference pictures can potentially be used for inter-predicting the current picture and pictures following the current picture in decoding order, or can potentially be used for inter-predicting only the pictures following the current picture in decoding order.

After constructing the reference picture subsets, the video decoder may order the reference picture subsets in different orders to derive the reference picture set. As one example, the order of the reference picture set may be RefPicSetStCurr0, RefPicSetStCurr1, RefPicSetStFoll0, RefPicSetStFoll1, RefPicSetLtCurr, and RefPicSetLtFoll. However, other ordering of the subsets may be possible to derive the reference picture set. For instance, as another example, the order of the reference picture set may be the RefPicSetStCurr0 reference picture subset, followed by the RefPicSetStCurr1 reference picture subset, followed by the RefPicSetLtCurr reference picture subset, followed by the RefPicSetStFoll0 reference picture subset, followed by the RefPicSetStFoll1 reference picture subset, and followed by RefPicSetLtFoll reference picture subset.

In one example, the RefPicSetStCurr0, RefPicSetStCurr1, and RefPicSetLtCurr subsets include all reference pictures that may be used in inter-prediction of a block in the current picture and that may be used in inter-prediction of one or more of the pictures following the current picture in decoding order. The RefPicSetStFoll0, RefPicSetStFoll1, and RefPicSetLtFoll subsets include all reference pictures that are not used in inter-prediction of the block in the current picture, but may be used in inter-prediction of one or more of the pictures following the current picture in decoding order.

It should be understood that the six reference picture subsets are described for illustration purposes only, and should not be considered limiting. In alternate examples, there may be more or fewer reference picture subsets. Such reference picture subsets, in these alternate examples, are described in more detail below.

Once the video decoder derives the reference picture set, e.g. from the plurality of reference picture subsets as described above or by some other process, the video decoder may construct the reference picture lists (e.g., List 0 and List 1) from the reference picture set. Examples according to this disclosure provide techniques for modification of reference picture lists after such lists have been initially generated. In one example, a video coder signals whether an initial reference picture list is to be modified. When the initial reference picture list is to be modified, the video coder can signal information indicating a starting position in the initial reference picture list. When the starting position signaled by the video coder is less than a number of pictures included in the initial reference picture list, then the video coder signals the number of pictures to be inserted into the initial reference picture list, and a selected reference picture superset and an index into the selected reference picture superset from which a picture can be retrieved to insert into the initial reference picture list to construct a modified reference picture list. The selected reference picture superset includes one or more subsets of the reference picture set.

In some examples, a video coder does not expressly signal information indicating a starting position in the initial reference picture list. The video coder does, however, in such an example, signal the number of pictures to be inserted into the initial reference picture list. Additionally, the video coder may optionally signal a selected reference picture superset and indexes into the selected reference picture superset from which pictures can be retrieved to insert into the initial reference picture list to construct the modified reference picture list. In cases where the list modification starting position is not expressly signaled, a video coder, e.g., a video decoder can infer that the starting position for list modification is the first index position in the reference picture list, e.g., index 0, and then insert the signaled number of pictures to be inserted into the initial list starting at index 0 to construct the modified reference picture list.

Thus, in one such an example according to this disclosure, a method for encoding video data includes coding information indicating a number of pictures to be inserted into an initial reference picture list to construct a modified reference picture list. In another example, a video encoding device includes a video encoder configured to encode information indicating a number of pictures to be inserted into an initial reference picture list to construct a modified reference picture list. In another example, a video decoding device includes a video decoder. The video decoder is configured to determine a number of pictures to be inserted into an initial reference picture list to construct a modified reference picture list based on a coded syntax element and insert the number of pictures into the initial reference picture list to construct the modified reference picture list.

FIG. 1 is a block diagram illustrating an example video encoding and decoding system 10 that may utilize techniques described in this disclosure. In FIG. 1, system 10 includes a source device 12 that generates encoded video for decoding by destination device 14. Source device 12 and destination device 14 may each be an example of a video coding device. Source device 12 may transmit the encoded video to destination device 14 via communication channel 16 or may store the encoded video on a storage medium 17 or a file server 19, such that the encoded video may be accessed by the destination device 14 as desired.

Source device 12 and destination device 14 may comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, a wireless communication device, or the like.

As indicated above, in many cases, source device 12 and/or destination device 14 may be equipped for wireless communication. Hence, communication channel 16 may comprise a wireless channel, a wired channel, or a combination of wireless and wired channels suitable for transmission of encoded video data. Similarly, the file server 19 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

The techniques of this disclosure, however, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, a modulator/demodulator (MODEM) 22 and an output interface 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via output interface 24. Modem 22 may include various mixers, filters, amplifiers or other components designed for signal modulation. Output interface 24 may include circuits designed for transmitting data, including amplifiers, filters, and one or more antennas.

The captured, pre-captured, or computer-generated video that is encoded by the video encoder 20 may also be stored onto a storage medium 17 or a file server 19 for later consumption. The storage medium 17 may include Blu-ray discs, DVDs, CD-ROMs, flash memory, or any other suitable digital storage media for storing encoded video. The encoded video stored on the storage medium 17 may then be accessed by destination device 14 for decoding and playback.

File server 19 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 19 may be a streaming transmission, a download transmission, or a combination of both. The file server 19 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes an input interface 26, a modem 28, a video decoder 30, and a display device 32. Input interface 26 of destination device 14 receives information over channel 16, as one example, or from storage medium 17 or file server 19, as alternate examples, and modem 28 demodulates the information to produce a demodulated bitstream for video decoder 30. The demodulated bitstream may include a variety of syntax information generated by video encoder 20 for use by video decoder 30 in decoding video data.

Such syntax may also be included with the encoded video data stored on a storage medium 17 or a file server 19. As one example, the syntax may be embedded with the encoded video data, although aspects of this disclosure should not be considered limited to such a requirement. The syntax information defined by video encoder 20, which is also used by video decoder 30, may include syntax elements that describe characteristics and/or processing of video blocks, such as coding tree units (CTUs), coding tree blocks (CTBs), prediction units (PUs), coding units (CUs) or other units of coded video, e.g., video slices, video pictures, and video sequences or groups of pictures (GOPs). Each of video encoder 20 and video decoder 30 may form part of a respective encoder-decoder (CODEC) that is capable of encoding and/or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD10 hereinafter, is available, as of Jan. 25, 2013, from http://phenix.int-evry.fr/jct/doc_end user/documents/12_Geneva/wg11/JCTVC-L1003-v9.zip.

The techniques of this disclosure, however, are not limited to any particular coding standard. For purposes of illustration only, the techniques are described in accordance with the HEVC standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more processors including microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. In some instances, video encoder 20 and video decoder 30 may be commonly referred to as a video coder that codes information (e.g., pictures and syntax elements). The coding of information may refer to encoding when the video coder corresponds to video encoder 20. The coding of information may refer to decoding when the video coder corresponds to video decoder 30.

Furthermore, the techniques described in this disclosure may refer to video encoder 20 signaling or coding information. When video encoder 20 signals or codes information, the techniques of this disclosure generally refer to any manner in which video encoder 20 provides the information. For example, when video encoder 20 signals syntax elements to video decoder 30, it may mean that video encoder 20 transmitted the syntax elements to video decoder 30 via output interface 24 and communication channel 16, or that video encoder 20 stored the syntax elements via output interface 24 on storage medium 17 and/or file server 19 for eventual reception by video decoder 30. In this way, signaling from video encoder 20 to video decoder 30 should not be interpreted as requiring transmission from video encoder 20 that is immediately received by video decoder 30, although this may be possible. Rather, signaling from video encoder 20 to video decoder 30 should be interpreted as any technique with which video encoder 20 provides information for eventual reception by video decoder 30, either directly or via an intermediate storage (e.g., in storage medium 17 and/or file server 19).

Video encoder 20 and video decoder 30 may be configured to implement the techniques described in this disclosure for constructing (sometimes referred to as initializing) and modifying a reference picture list. For example, video encoder 20 is configured to signal whether a reference picture list for a current picture is to be modified and a number of different parameters by which such modification is to be executed. Video decoder 30 of destination device 14 is configured to receive the information coded by video encoder 20 in relation to different coded pictures of a bitstream received from source device 12 and execute reference picture list modification in accordance with the information signaled by video encoder 20.

In one example according to this disclosure, video encoder 20 is configured to signal whether a reference picture list for a current picture is to be modified. In the event the reference picture list is to be modified, video encoder 20 signals a starting position in the initial reference picture list that indicates a position at which to begin modification of the initial list. In some examples, video encoder 20 does not expressly signal information indicating a starting position in the initial reference picture list. Video encoder 20 does, however, in such an example, signal the number of pictures to be inserted into the initial reference picture list. In the event the starting position is not signaled by video encoder 20, video decoder 30 can infer the starting position for reference picture list modification to be the first index position in the reference picture list, e.g., index 0.

In one example, video encoder 20 may be configured to code information related to the reference picture list modification such that the when the starting position, whether expressly signaled or inferred by video encoder 20, signaled by encoder 20 is less than a number of pictures included in the initial reference picture list, then encoder 20 signals the number of pictures to be inserted into the initial reference picture list to construct a modified reference picture list. Video encoder 20 also codes information indicating a selected reference picture superset and an index into the selected reference picture superset from which a picture can be retrieved to insert into the initial reference picture list to construct a modified reference picture list. The selected reference picture superset includes one or more subsets of the reference picture set.

There may be various ways in which video encoder 20 may signal syntax elements in a coded bitstream that video decoder 30 may utilize for initializing and modifying reference picture lists. For example, video encoder 20 may signal the syntax elements in the picture parameter set (PPS), sequence parameter set (SPS), the picture header (if any), the slice header, or any combination thereof. In one example, video encoder 20 signals the syntax elements using the SPS, the PPS, and the slice header.

As the selected and other candidate reference picture supersets that serve as a source of reference pictures used for reference picture list modification each include one or more subsets of the reference picture set, video decoder 30 may need to derive the reference picture set to carry out such modification. Additionally, the reference picture set and subsets thereof is employed by video decoder 30 to construct initial reference pictures list(s). The reference picture set may be constructed in a number of ways. In one example, video decoder 30 derives the reference picture set, and after such derivation, video decoder 30 constructs the initial and modified reference picture lists. In this manner, in some cases, only reference pictures in the reference picture set may be candidate reference pictures that are used to construct a reference picture list.

To construct the reference picture set, in some cases, video decoder 30 constructs a number of different reference picture subsets. The combination of the reference picture subsets together form the reference picture set. For example, video encoder 20 explicitly signals, in a coded bitstream, values that allow video decoder 30 to determine identifiers for the reference pictures that are included in the reference picture set. For instance, the identifiers of the reference pictures can be the picture order counts of the pictures. Each picture is associated with one picture order count, referred to as PicOrderCnt. PicOrderCnt indicates the output order or display order of the corresponding picture relative to the previous IDR picture in decoding order, and, in some other alternatives, indicates the position of the associated picture in output order relative to the output order positions of the other pictures in the same coded video sequence.

The PicOrderCnt is sometimes referred to as a picture order count (POC) value. As with PicOrderCnt, POC value may indicate the output or display order of a picture, and may be used to identify a picture. For example, within a coded video sequence, a picture with a smaller POC value is outputted or displayed earlier than a picture with larger POC value.

There may be various ways in which video decoder 30 determines the identifiers for pictures that belong to the reference picture set. In general, video encoder 20 may signal values from which video decoder 30 may determine the identifiers for pictures, including the pictures that belong to the reference picture set. In one example, the identifiers of the pictures are the PicOrderCnt or POC values. The POC value of a given picture may be relative to the previous instantaneous decoding refresh (IDR) picture. For example, the PicOrderCnt (i.e., POC value) for an IDR picture may be 0, the POC value for the picture after the IDR picture in display or output order may be 1, the POC value for the picture after the picture with POC value 1 in display or output order may be 2, and so forth.

Video decoder 30 can implement a number of different methods of determining the identifiers for pictures that belong to the reference picture set and subsets thereof. One such method is described in U.S. application Ser. No. 13/622,931, filed Sep. 19, 2012, the entire contents of which are incorporated herein by reference. However, other methods may be employed by video decoder 30 to determine the identifiers for pictures that belong to the reference picture set.

Regardless of the particular method, video decoder 30 can determine the identifiers for the reference pictures, and from these identifiers construct the reference picture subsets of the reference picture set. From these reference picture subsets, video decoder 30 derives the reference picture set. In some examples, each of the reference picture subsets include different reference pictures, in that there is no overlap of reference pictures in the reference picture subsets. In this way, each of the reference pictures may be in only one of the reference picture subsets, and in no other reference picture subset. However, aspects of this disclosure should not be considered so limited.

After determining the identifiers (e.g., POC values) of the reference pictures in the reference picture set or its subsets, video decoder 30 constructs the reference picture subsets. In one example, video decoder 30 constructs six reference picture subsets, although it may be possible for video decoder 30 to construct more or fewer reference picture subsets. These six reference picture subsets are named: RefPicSetStCurr0, RefPicSetStCurr1, RefPicSetStFoll0, RefPicSetStFoll1, RefPicSetLtCurr, and RefPicSetLtFoll. The RefPicSetStCurr0 reference picture subset may be referred to as the RefPicSetStCurrBefore reference picture subset, and the RefPicSetStCurr1 reference picture subset maybe referred to as the RefPicSetStCurrAfter reference picture subset.

In one example, the RefPicSetStCurr0, RefPicSetStCurr1, RefPicSetStFoll0, and RefPicSetStFoll1 reference picture subsets identifies short-term reference pictures. A short-term reference picture may be defined as a reference picture for which the identification information is included in the short_term_ref_pic_set( ) syntax structure for a coded picture, either included in the slice header(s) or included in the referred sequence parameter set and referenced by the short_term_ref_pic_set_idx syntax element in the slice header(s). In some examples, the RefPicSetStCurr0, RefPicSetStCurr1, RefPicSetStFoll0, and RefPicSetStFoll1 reference picture subsets may identify short-term reference pictures based on whether the short-term reference pictures are earlier in display order or later in display order than the current picture being coded, as well as whether the short-term reference pictures can potentially be used for inter-predicting the current picture and pictures following the current picture in decoding order, or can potentially be used for inter-predicting only the pictures following the current picture in decoding order.

For example, the RefPicSetStCurr0 reference picture subset may include, and may only include, identification information, such as POC values, of all short-term reference pictures that have an earlier output or display order than the current picture, and that can potentially be used for reference in inter-prediction of the current picture, and can potentially be used for reference in inter-prediction of one or more pictures following the current picture in decoding order. The RefPicSetStCurr1 reference picture subset may include, and may only include, identification information of all short-term reference pictures that have a later output or display order than the current picture and that can potentially be used for reference in inter-prediction of the current picture, and can potentially be used for reference in inter-prediction of one or more pictures following the current picture in decoding order.

The RefPicSetStFoll0 reference picture subset may include, and in some examples may only include, identification information of all short-term reference pictures that have an earlier output or display order than the current picture, that can potentially be used for reference in inter-prediction of one or more pictures following the current picture in decoding order, and that cannot be used for reference in inter-prediction of the current picture. The RefPicSetStFoll1 reference picture subset may include, and may only include, identification information of all short-term reference pictures that have a later output or display order than the current picture, that can potentially be used for reference in inter-prediction of one or more pictures following the current picture in decoding order, and that cannot be used for reference in inter-prediction of the current picture.

The RefPicSetLtCurr and the RefPicSetLtFoll reference picture subsets may identify long-term reference pictures. A long-term reference picture may be defined as a reference picture for which the identification information is not included in the short_term_ref_pic_set( ) syntax for a coded picture. In some examples, the RefPicSetLtCurr and the RefPicSetLtFoll reference picture subsets may identify long-term reference pictures based on whether the long-term reference pictures can potentially be used for inter-predicting the current picture and pictures following the current picture in decoding order, or can potentially be used for inter-predicting only the pictures following the current picture in decoding order.

For example, the RefPicSetLtCurr reference picture subset may include, and in some examples may only include, the identification information of all long-term reference pictures that can potentially be used for reference in inter-prediction of the current picture, and that can potentially be used for reference in inter-prediction of one or more pictures following the current picture in decoding order. The RefPicSetLtFoll reference picture subset may include, and may only include, the identification information of all long-term reference pictures that can potentially be used for reference in inter-prediction of one or more pictures following the current picture in decoding order, and that cannot be used for reference in inter-prediction of the current picture.

After constructing the reference picture subsets, video decoder 30 may order the reference picture subsets in different order to derive the reference picture set. As one example, the order of the reference picture set may be RefPicSetStCurr0, RefPicSetStCurr1, RefPicSetStFoll0, RefPicSetStFoll1, RefPicSetLtCurr, and RefPicSetLtFoll. However, other ordering of the subsets may be possible to derive the reference picture set. For instance, as another example, the order of the reference picture set may be the RefPicSetStCurr0 reference picture subset, followed by the RefPicSetStCurr1 reference picture set, followed by the RefPicSetLtCurr reference picture subset, followed by the RefPicSetStFoll0 reference picture subset, followed by the RefPicSetStFoll1 reference picture subset, and followed by RefPicSetLtFoll reference picture subset.

In one example, the RefPicSetStCurr0, RefPicSetStCurr1, and RefPicSetLtCurr subsets include all reference pictures that may be used in inter-prediction of a block in the current picture and that may be used in inter-prediction of one or more of the pictures following the current picture in decoding order. The RefPicSetStFoll0, RefPicSetStFoll1, and RefPicSetLtFoll subsets include all reference pictures that are not used in inter-prediction of the block in the current picture, but may be used in inter-prediction of one or more of the pictures following the current picture in decoding order.

Again, it should be understood that the six reference picture subsets are described for illustration purposes only, and should not be considered limiting. In alternate examples, there may be more or fewer reference picture subsets.

After deriving the reference picture set, video decoder 30 may begin decoding of slices within a picture. Part of the decoding process involves construction of one or more reference picture lists. In some cases, video decoder 30 constructs two reference picture lists, which are sometimes referred to as List 0 and List 1.

A reference picture list is a list of reference pictures that is used for prediction of a P or B slice of a picture. For the decoding process of a P slice, there is one reference picture list (List 0). For the decoding process of a B slice, there are two reference picture lists (List 0 and List 1). List 0, sometimes referred to as reference picture list 0 or RefPicList0, is a reference picture list used for inter-prediction of a P or B slice. All inter-prediction used for P slices uses List 0. Reference picture list 0 is one of the two reference picture lists used for bi-prediction for a B slice, with the other being reference picture list 1. List 1, sometimes referred to as reference picture list 1 or RefPicList1, is a reference picture list used for prediction of a B slice. Reference picture list 1 is one of two reference picture lists used for prediction for a B slice, with the other being reference picture list 0. Some blocks in a B slice may be bi-predicted, using both List 0 and List 1, and some blocks in a B slice may be uni-predicted, using either List 0 or List 1.

To construct the reference picture lists, video decoder 30 may implement a default construction technique to construct initial List 0 and, for B slices, initial List 1. The construction of the initial List 0 and initial List 1 may be referred to as the initialization process. In some examples, the coded bitstream may indicate that video decoder 30 should modify the initial List 0 and/or initial List 1 to generate the final List 0 and the final List 1. The modification of the initial List 0 and/or initial List 1 may be referred to as the modification process. The modification process may not be required in every time video decoder 30 initializes a reference list, e.g. List 0 and/or List 1, and the manner in which video decoder 30 may implement the modification process in accordance with this disclosure is described in more detail below.

Video decoder 30 can initialize List 0 and List 1 in a variety of ways. In one example, video decoder 30 may construct the initial List 0 or the initial List 1 in such a manner that video decoder 30 may not need to perform reordering of the reference pictures to be included in the initial List 0 or the initial List 1, regardless of whether the modification process is needed, because the reference pictures in each of the reference picture subsets are already in a proper order. In other examples, regardless of whether the modification process is needed, reordering of the reference pictures to be included in the initial List 0 or the initial List 1 according to their POC values when adding or listing the reference pictures into the initial List 0 or the initial List 1 is needed.

In the initialization process, video decoder 30 may implement a default construction technique to construct the initial List 0 and the initial List 1. The default construction technique may mean that video decoder 30 constructs the initial reference picture lists without receiving syntax elements from video encoder 20 regarding the manner in which video decoder 30 should construct the initial reference picture lists, or which reference pictures should be identified in the initial reference picture lists. In another example, video encoder 20 may code information indicating the manner in which List 0 and/or List 1 is to be initially constructed, which information video decoder 30 may, in turn, interpret to construct the lists.

In general, video decoder 30 may invoke the reference picture list construction process when decoding a P or B slice header. For example, when decoding a P slice, video decoder 30 may invoke the process for constructing initial List 0, but may not invoke the process for constructing the initial List 1 because a block in a P slice is only uni-predicted with respect to a reference picture identified in List 0. When decoding a B slice, video decoder 30 may invoke the process for constructing the initial List 0 and constructing the initial List 1 because a block in a B slice may be bi-predicted with respect to reference pictures identified in each of the List 0 and the List 1.

In some cases, video decoder 30 may base the construction of the initial List 0 and the initial List 1 on the reference picture subsets of the reference picture set. For example, the initial List 0 and the initial List 1 may list zero or more reference pictures identified in RefPicSetStCurr0, RefPicSetStCurr1, or RefPicSetLtCurr. In this example, when the reference picture list construction process is invoked, there may be at least one reference picture in RefPicSetStCurr0, RefPicSetStCurr1, and RefPicSetLtCurr. Although the initial List 0 and the initial List 1 may identify one or more reference pictures from the same reference picture subsets, the order in which video decoder 30 adds the reference pictures in the initial List 0 may be different than the order in which video decoder 30 adds the reference pictures in the initial List 1.

When video decoder 30 adds (e.g., lists) reference pictures to the initial List 0 or initial List 1, or a modified reference picture list, this disclosure may describe such actions as video decoder 30 identifying the reference pictures in the list. For example, the plurality of reference picture subsets may each identify zero or more reference pictures. To construct initial or modified List 0 and List 1, video decoder 30 may identify one or more of the reference pictures that are identified in the reference picture subsets into the initial or modified List 0 or List 1.

To avoid confusion and to assist with clarity, this disclosure may refer to video decoder 30 listing or adding zero or more of the reference pictures that are identified in the reference picture subsets into the initial or modified List 0 and List 1 to construct the list(s). In this manner, video decoder 30 adding or listing reference pictures means that video decoder 30 adds or lists an identifier of the reference picture identified in reference picture subset. Accordingly, the resulting initial or modified List 0 and List 1 include a plurality of identifiers for the reference pictures that can potentially be used for coding a block or slice of a current picture. These reference pictures can be, e.g., stored in respective decoded picture buffers of video decoder 30 and video encoder 20.

For example, to construct the initial List 0, video decoder 30 may first list (e.g., add) the reference pictures identified in RefPicSetStCurr0 in initial List 0, followed by the reference pictures identified in RefPicSetStCurr1 in initial List 0, and then reference pictures identified in RefPicSetLtCurr in initial List 0. To construct the initial List 1, video decoder 30 may first list (e.g., add) the reference pictures identified in RefPicSetStCurr1 in initial List 1, followed by the reference pictures identified in RefPicSetStCurr0 in initial List 1, and then reference pictures identified in RefPicSetLtCurr in initial List 1.

Moreover, in addition to adding the reference pictures in the reference picture subsets in different order, video decoder 30 may utilize a different number of reference pictures from each of the reference picture subsets when constructing List 0 and List 1. For example, List 0 and List 1 need not include all of the reference pictures from RefPicSetStCurr0, RefPicSetStCurr1, and RefPicSetLtCurr. Rather, the number of reference pictures that are listed from these example reference picture subsets to construct initial List 0 and initial List 1 may be based on the syntax elements that indicate the maximum number of reference pictures within each of the initial List 0 and the initial List 1.

Regardless of the particular technique employed to construct an initial reference picture list, including, e.g., initial List 0 and List 1, after such initialization, video decoder 30 can, if so signaled by video encoder 20, modify the initial list(s). As described above, video decoder 30 can, in the process of executing reference picture list modification in accordance with information signaled by video encoder 20, construct a number of reference picture supersets from the subsets of the reference picture set. Such reference picture supersets serve as a source of reference pictures to use to modify the initial reference picture list.

In one example, video decoder 30 constructs one or more candidate reference picture supersets from the reference picture set. Each candidate reference picture super set includes one or more of the reference picture subsets of the reference picture set. Additionally, video decoder 30 selects one of the candidate reference picture supersets from which picture(s) can be retrieved to insert into the initial reference picture list to construct a modified reference picture list.

In one example, video decoder 30 constructs the candidate reference picture supersets from the reference picture set by combining the RefPicSetStCurrBefore subset and the RefPicSetStCurrAfter subset of the reference picture set to construct a first candidate reference picture superset and constructing a second candidate reference picture superset based on an inter-view reference picture subset of the reference picture set.

In some cases, video data coded and otherwise processed by source device 12 and/or destination device 14 can include multiple views that when viewed together appear to have a three-dimensional effect. Each view of such a multi-view video includes a sequence of temporally related two-dimensional pictures. Additionally, the pictures making up the different views are temporally aligned such that in each time instance of the multi-view video each view includes a two-dimensional picture that is associated with that time instance.

Multiview and 3D video coding can be implemented in a variety of ways, including according to a number of standards related thereto. For example, 3D video coding can be implemented in accordance with a 3DVC extension to H.264/AVC, which is presently under development, and sometimes referred to as the MVC compatible extension including depth (MVC+D). In other examples, 3D video coding can be implemented in accordance with another 3DVC extension to H.264/AVC, which is sometimes referred to as the AVC-compatible video-plus-depth extension to H.264/AVC (3D-AVC). Additionally, multiview video coding can be implemented in accordance with a multiview video coding extension of high efficiency video coding (HEVC) (MV-HEVC) or a multiview plus depth coding with HEVC-based technology extension (3D-HEVC) of the High-Efficiency Video Coding (HEVC) video coding standard.

Because two (or more) pictures at the same time instance in two (or more) different views of a multiview video can include similar information, multiview video coding techniques include inter-view prediction. That is, pictures of one view (a "base view") may be intra- and inter-predicted (that is, temporally inter-predicted), and pictures of a non-base view may be inter-view predicted relative to pictures of the base view. In some examples of inter-view prediction, disparity motion vectors may be used to indicate locations of reference blocks for a current block in a current view, relative to a reference picture in a base view (or other reference view). Non-base views used as reference views may be considered base views when coding a non-base view relative to the reference view.

In examples according to this disclosure in which inter-view prediction is available, video decoder 30 can construct candidate reference picture supersets based on an inter-view reference picture subset of the reference picture set. The availability of inter-view prediction may be a function of the type of video being coded or otherwise processed by source device 12 and destination device 14. Additionally, inter-view prediction availability may be signaled by video encoder 20, as well as video encoder 20 coding information regarding the particular manner in which the inter-view reference picture subset is to be constructed. Video decoder 30 can then determine the availability of inter-view prediction and, if appropriate based on whether reference picture list modification is needed, construct the inter-view reference picture subset of the reference picture set.

Aside from the reference picture subsets that contain long-term or short-term temporal reference pictures, in HEVC extensions, there may be reference pictures from a different view (or different layer). Such pictures can be identified and form the basis for a different reference picture set or subset, e.g., an inter-view reference picture set or subset. In general, if it is necessary or desirable to distinguish whether the picture to be modified to the current position of a reference picture list is from a non-inter-view reference picture subset, it can also be desirable to distinguish whether the picture is from an inter-view reference picture set or subset. Regardless of the manner in which it is constructed, the inter-view reference picture subset can include reference pictures of the reference picture set that are used to inter-view predict pictures of one view relative to pictures of another view.

In another example, video decoder 30 constructs the candidate reference picture supersets from the reference picture set by combining the RefPicSetStCurr0 subset, the RefPicSetStCurr1 subset, the RefPicSetStFoll0 subset, the RefPicSetStFoll1 subset, the RefPicSetLtCurr subset, and the RefPicSetLtFoll subset of the reference picture set to construct a first candidate reference picture superset. It is noted that the selected and candidate reference picture "supersets" are so named at least in part for clarity to distinguish between the reference picture "set" and "subsets" and reference picture "lists." However, in another example, the selected and candidate collections of reference pictures, from which picture(s) can be retrieved by video decoder 30 to insert into an initial reference picture list to construct a modified reference picture list, may be referred to by other names, including, e.g. source reference picture lists. Regardless of the naming convention, in examples according to this disclosure video encoder 20, video decoder 30, and/or another device can be configured to construct or reference previously constructed sets, subsets, supersets, lists, or other sources of reference pictures that may be used as a basis for modifying an initial reference picture list that is used to inter-predict a current picture or portion thereof.

As noted above, when the starting position signaled by encoder 20 is less than a number of pictures included in the initial reference picture list, then encoder 20 signals the number of pictures to be inserted into the initial reference picture list to construct a modified reference picture list. The number of pictures to be inserted into the initial reference picture list can be used by video decoder 30 as a counter for a loop that iteratively inserts reference pictures into the initial reference picture list to construct the modified reference picture list.

In one example, video decoder 30 iteratively identifies a reference picture in the selected reference picture superset using the index into the selected reference picture superset signaled by video encoder 20. Video decoder 30 then associates the identified reference picture with a current index of the initial reference picture list to construct the modified reference picture list. Video decoder 30 starts this process at the starting position signaled by video encoder 20 and repeats the process for a number of times equal to the number of pictures to be inserted into the initial reference picture list also signaled by video encoder 20.

In the process of inserting pictures into the initial reference picture list, video decoder 30 may shift the index values of the existing pictures of the initial list. In one example, for each iteration of identifying a reference picture to insert and associating the reference picture with the current index of the initial reference picture list, video decoder 30 increases by one the index of the picture associated with the current index in the initial reference picture list before the identified reference picture was associated with the current index and any pictures associated with an index in the initial reference picture list that is greater than the current index.

For example, the initial reference picture list may include five reference pictures picture 1, picture 2, picture 3, picture 4, and picture 5 indexed at index 1, index 2, index 3, index 4, and index 5, respectively. Video encoder 20 signals a starting position for reference picture list modification equal to index 2 in the initial reference picture list and also signals that 2 pictures are to be inserted into the initial list to construct the modified reference picture list. In such a case, video decoder 30 iteratively identifies two pictures from the selected reference picture superset to insert into the initial reference picture list and associates the first identified picture with index 2 and the second identified picture with index 3. After inserting the identified pictures, the modified reference picture list includes picture 1, inserted picture 1, inserted picture 2, picture 2, picture 3, picture 4, and picture 5. Video decoder 30 can shift the index values of the original pictures of the initial list such that picture 1, inserted picture 1, inserted picture 2, picture 2, picture 3, picture 4, and picture 5 of the modified reference picture list are associated with index values of index 1, index 2, index 3, index 4, index 5, index 6, and index 7, respectively.

In some cases, the number of pictures that can be included in a reference picture list used for inter-predicting a picture may be limited. For example, video encoder 20 signals a maximum number of pictures allowed in a reference picture list, which video decoder 30, in turn, references when initializing and modifying reference picture lists. In one example, after inserting a number of reference pictures into the initial reference picture list based on the starting position and number of reference pictures to be inserted information coded by video encoder 20, video decoder 30 truncates the modified reference picture list such that the number of pictures included in the list does not exceed the maximum of pictures allowed in a reference picture list.

For example, video encoder 20 truncates the modified reference picture list such that any pictures associated with an index that is greater than a maximum number of pictures allowed in a reference picture list are removed from the modified reference picture list. With reference to the reference picture list modification example described above, video decoder 20 removes picture 4 and picture 5 (of the initial reference picture list) associated with index 6 and index 7 from the modified reference picture list such that the modified reference picture list includes picture 1, inserted picture 1, inserted picture 2, picture 2, and picture 3 associated with index 1, index 2, index 3, index 4, and index 5, respectively.

The above techniques describe an example manner in which video decoder 30 may modify one or more initial reference picture lists. The foregoing techniques and other examples according to this disclosure can be applied to different reference picture lists, including, e.g., List 0 and List 1. Additionally, it is noted that, during the encoding process, video encoder 20 may also need to decode encoded pictures for purposes of encoding subsequent pictures, in what is referred to as the reconstruction process. Accordingly, in some examples, video encoder 20 may also be configured to modify initial reference picture list(s). In some examples, video encoder 20 may implement the same techniques that video decoder 30 implemented to modify a reference picture list.

Accordingly, in some examples, a video coder (e.g., video encoder 20 or video decoder 30) may code (e.g., encode or decode, respectively) information indicative of whether to modify a reference picture list and the manner in which such list is to be modified. For example, video encoder 20 may signal an encoded bitstream that includes value(s) representing a starting position in an initial reference picture list that indicates a position at which to begin modification of the initial list and also, when the starting position signaled by encoder 20 is less than a number of pictures included in the initial reference picture list, value(s) representing the number of pictures to be inserted into the initial reference picture list to construct a modified reference picture list. Similarly, video decoder 30 may decode the bitstream to determine where to begin modification of an initial list, e.g. initial List 0 and/or List 1, and how many pictures to insert into the initial list to construct the modified list.

The video coder may also code information indicating the source of reference pictures that are to be inserted into the initial reference picture list. For example, the video coder codes values representing a selected reference picture superset and an index into the selected reference picture superset from which a picture can be retrieved to insert into the initial reference picture list to construct the modified reference picture list. The selected reference picture superset can include one or more subsets of the reference picture set. The video coder may construct a number of reference picture supersets based on one or more subsets of the reference picture set. The video coder can then select one of the candidate supersets as the source of the reference pictures that are to be inserted into the initial reference picture list to construct the modified list.

The previous examples described the manner in which video encoder 20 and video decoder 30 may derive a reference picture set, as well as example techniques for constructing reference picture lists when no modification is needed and when modification is needed. In some examples, some of the reference picture set and list construction/modification techniques may be implemented using a decoded picture buffer (DPB). The DPB may be a buffer that stores decoded pictures.

Each of video encoder 20 and video decoder 30 may include respective DPBs. For example, as part of the encoding process, video encoder 20 may decode a current picture, store the decoded picture in the DPB of video encoder 20, and utilize the decoded picture stored in the DPB for inter-predicting a subsequent picture. Similarly, as part of the decoding process, video decoder 30 may decode a current picture and store the decoded picture in the DPB of video decoder 30. Video decoder 30 may then utilize the decoded picture for inter-predicting a subsequent picture.

As described above, the techniques described in this disclosure may be performed in accordance with the HEVC standard. The following is a brief description of the HEVC standard to assist with understanding. Furthermore, although the techniques are described in context of the HEVC standard, the techniques may be extendable to other standards, including proprietary standards.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in decoding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes. Treeblocks may be referred to as LCUs in some examples.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
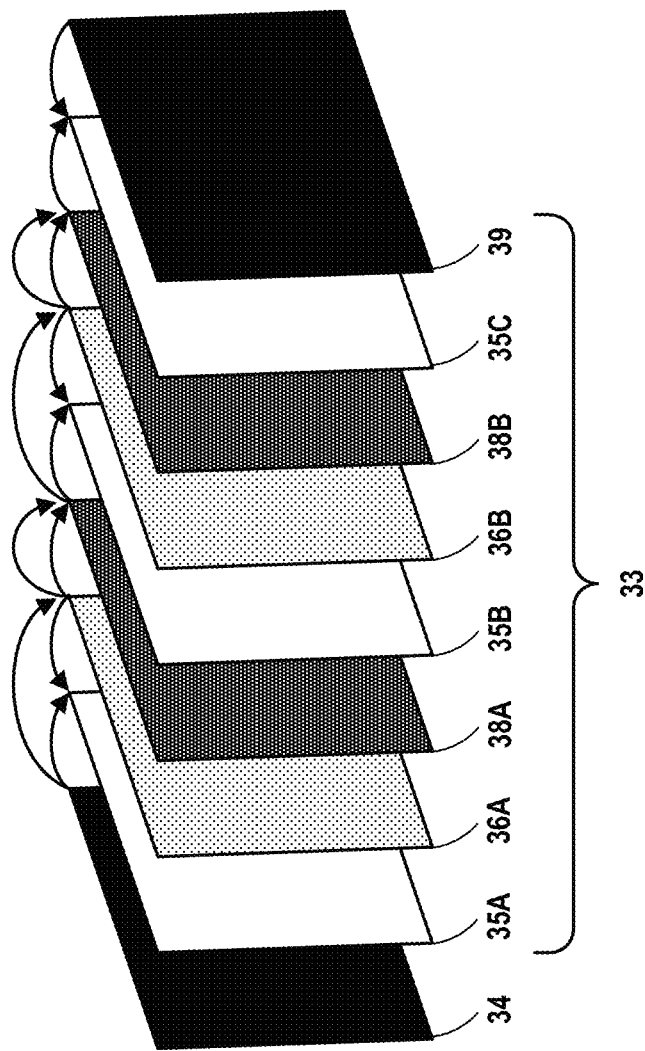
FIG. 2 is a conceptual diagram illustrating an example video sequence that includes a plurality of pictures that are encoded and transmitted.

FIG. 2 is a conceptual diagram illustrating an example video sequence 33 that includes a plurality of pictures that are encoded and transmitted. In some cases, video sequence 33 may be referred to as a group of pictures (GOP). Video sequence 33, as illustrated, includes pictures 35A, 36A, 38A, 35B, 36B, 38B, and 35C, and final picture 39 in display order. Picture 34 is a final picture in display order for a sequence occurring before sequence 33. FIG. 2 generally represents an exemplary prediction structure for a video sequence and is intended only to illustrate the picture references used for predicting video blocks of different slice or picture types (e.g., P picture or slice, or B picture or slice). An actual video sequence may contain more or fewer video pictures of different picture types and in a different display order. Video sequence 33 may include more or fewer pictures than those illustrated in FIG. 2, and the pictures illustrated in video sequence 33 are illustrated for purposes of understanding and as examples.

For block-based video coding, each of the video pictures included in sequence 33 may be partitioned into video blocks, such as coding units (CUs) or prediction units (PUs). For instance, each CU of a video picture may include one or more PUs. Video blocks in an intra-coded (I) picture are predicted using spatial prediction with respect to neighboring blocks in the same picture. Video blocks in an inter-coded (P or B) picture may use spatial prediction with respect to neighboring blocks in the same picture or temporal prediction with respect to other reference pictures.

Video blocks in a B picture may be predicted using bidirectional prediction to calculate two motion vectors from two different reference picture lists (e.g., reference picture lists 0 and 1, referred to as List 0 and List 1). In some cases, video blocks in a B picture may be predicted using unidirectional prediction from one of the two different reference picture lists (e.g., unidirectional B-coded). Video blocks in a P picture may be predicted using unidirectional prediction to calculate a single motion vector from a single reference picture list. In accordance with the emerging HEVC standard, the video blocks may be encoded using either unidirectional prediction to calculate a single motion vector from one of two reference picture lists or bidirectional prediction to calculate two motion vectors from the two reference picture lists. The two reference picture lists may contain past reference pictures or future reference pictures or both past and future reference pictures in display or output order, and always past reference pictures in decoding order, for example. Additionally, either or both of the two reference picture lists may include a modified reference picture list that was modified in accordance with examples of this disclosure after construction of an initial list.

In the example of FIG. 2, final picture 39 is designated for intra-mode coding as an I picture. In other examples, final picture 39 may be coded with inter-mode coding (e.g., as a P picture) with reference to final picture 34 of the preceding sequence, which may be an I picture. Video pictures 35A-35C (collectively "video pictures 35") are designated for coding as B pictures using bidirectional prediction with reference to a past picture and a future picture. In the illustrated example, picture 35A is encoded as a B picture with reference to final picture 34 and picture 36A, as indicated by the arrows from pictures 34 and 36A to video picture 35A. Pictures 35B and 35C are similarly encoded.

Video pictures 36A-36B (collectively "video pictures 36") may be designated for coding as pictures using unidirectional prediction with reference to a past picture. In the illustrated example, picture 36A is encoded as a P picture with reference to final picture 34, as indicated by the arrow from picture 34 to video picture 36A. Picture 36B is similarly encoded.

Video pictures 38A-38B (collectively "video pictures 38") may be designated for coding using bidirectional prediction with reference to the same past picture. In other examples, video pictures 38 may be encoded using bidirectional prediction with reference to substantially similar past pictures included in the reference picture lists. In the illustrated example, picture 38A is encoded with two references to picture 36A, as indicated by the two arrows from picture 36A to video picture 38A. Picture 38B is similarly encoded.

Video encoder 20 may signal a reference picture set for each of the pictures in sequence 33. For example, for picture 35A, this reference picture set may identify all reference pictures that can be used to inter-predict picture 35A, as well as all reference pictures that can potentially be used for inter-predicting pictures following picture 35A in decoding order. For example, the reference picture set for picture 35A may include the POC value for picture 34 and picture 36A, as well as POC values for additional reference pictures such as those that can potentially be used for inter-predicting pictures following picture 35A in decoding order. The pictures following picture 35A may be those pictures that follow picture 35A in decoding order, and that are within video sequence 33, in this example.

Video decoder 30 may then derive the reference picture set for picture 35A in the manner described above. For example, video decoder 30 may determine the POC values for the reference pictures that belong to the reference picture set, as described above. Video decoder 30 may further construct at least four or at least five reference picture subsets, and in some examples, up to the six reference picture subsets descried above. Video decoder 30 may arrange the six reference picture sets in a particular order to derive the reference picture set for picture 35A.

Video decoder 30 may further construct initial reference picture lists and, if signaled by video encoder 20, modify the initial lists in accordance with the examples of this disclosure. Video encoder 20 can signal reference picture list modification and video decoder 30 can modify the initial reference picture lists in the manner described above, including, by beginning modification at a particular starting position and inserting a particular number of reference pictures into the initial list.

Figure 3:
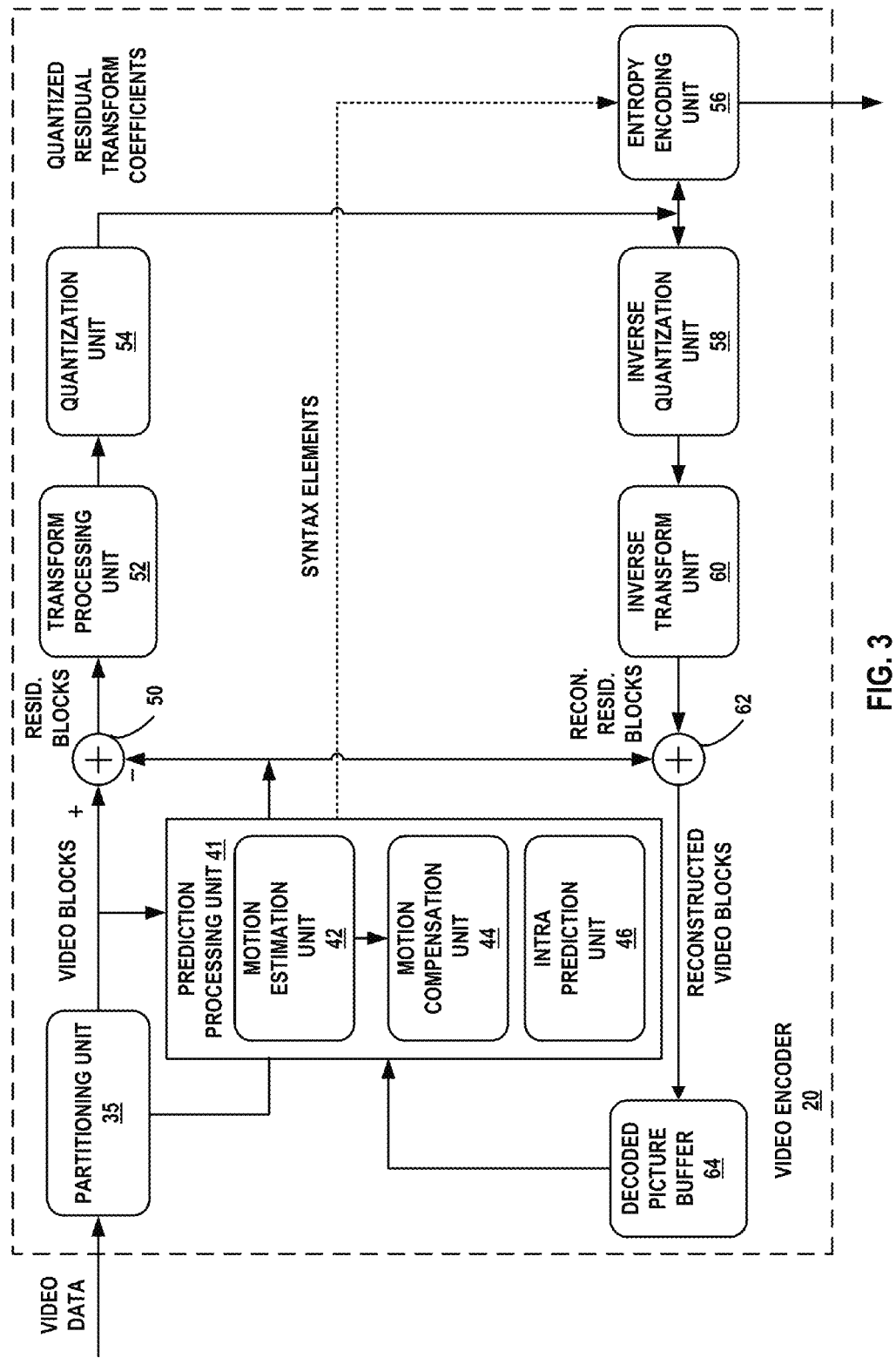
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 35, prediction processing unit 41, decoded picture buffer (DPB) 64, summer 50, transform processing unit 52, quantization unit 54, and entropy encoding unit 56. Prediction processing unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 3, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same picture or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In accordance with this disclosure, prediction processing unit 41 represents one example unit for performing the example functions described above. For example, prediction processing unit 41 determines which reference pictures belong to a reference picture set, and causes video encoder 20 to code information indicative of the reference pictures that belong to the reference picture set. Also, during the reconstruction process (e.g., the process used to reconstruct a picture for use as a reference picture and storage in decoded picture buffer 64), prediction processing unit 41 may construct reference picture subsets and derive the reference picture set from the constructed reference picture subsets. In some examples, prediction processing unit 41 constructs the initial reference picture lists in the manner described above. Additionally, prediction processing unit 41 can also modify the initial reference picture lists in the manner described above to construct the modified reference picture list.

In other examples, a unit other than prediction processing unit 41 may implement the examples described above. In some other examples, prediction processing unit 41 in conjunction with one or more other units of video encoder 20 may implement the examples described above. In yet some other examples, a processor or unit of video encoder 20 (not shown in FIG. 3) may, alone or in conjunction with other units of video encoder 20, implement the examples described above.

Figure 4:
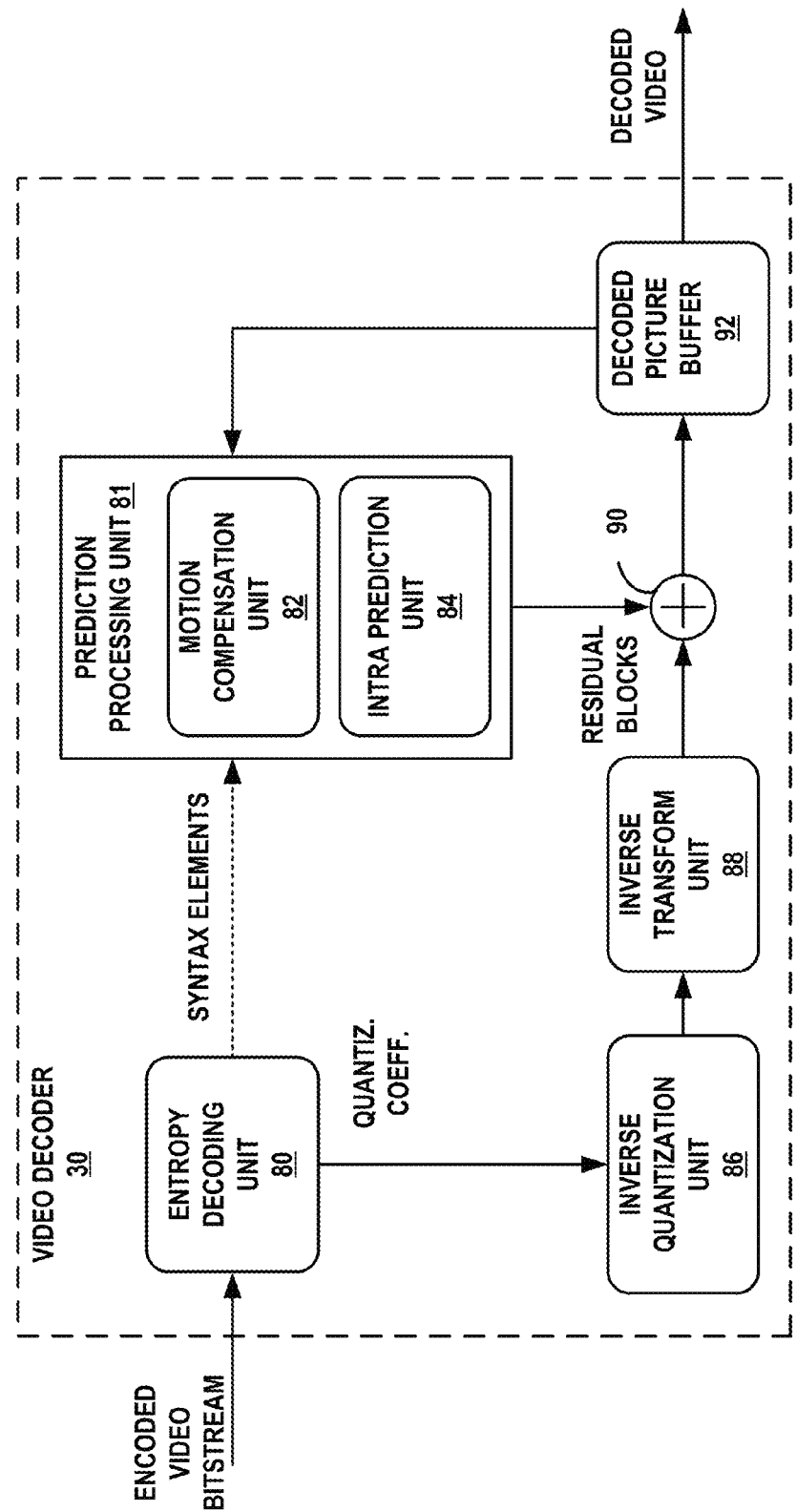
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes an entropy decoding unit 80, prediction processing unit 81, inverse quantization unit 86, inverse transformation unit 88, summer 90, and decoded picture buffer (DPB) 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current picture. When the video picture is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92. In some examples, video decoder 30 may construct List 0 and List 1 from the reference pictures identified in the derived reference picture set.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block based on either inter- or intra-prediction, video decoder 30 forms a decoded video block by summing the residual blocks from inverse transform unit 88 with the corresponding predictive blocks generated by prediction processing unit 81. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in decoded picture buffer 92, which stores reference pictures used for subsequent motion compensation. Decoded picture buffer 92 also stores decoded video for later presentation on a display device, such as display device 32 of FIG. 1.

In accordance with this disclosure, prediction processing unit 81 represents one example unit for performing the example functions described above. For example, prediction processing unit 81 may determine which reference pictures belong to a reference picture set, construct reference picture subsets, and derive the reference picture set from the constructed reference picture subsets. In some examples, prediction processing unit 81 constructs the initial reference picture lists and modifies one or more of the lists in the manner described above.

In other examples, a unit other than prediction processing unit 81 may implement the examples described above. In some other examples, prediction processing unit 81 in conjunction with one or more other units of video decoder 30 may implement the examples described above. In yet some other examples, a processor or unit of video decoder 30 (not shown in FIG. 4) may, alone or in conjunction with other units of video decoder 30, implement the examples described above.

Figure 5:
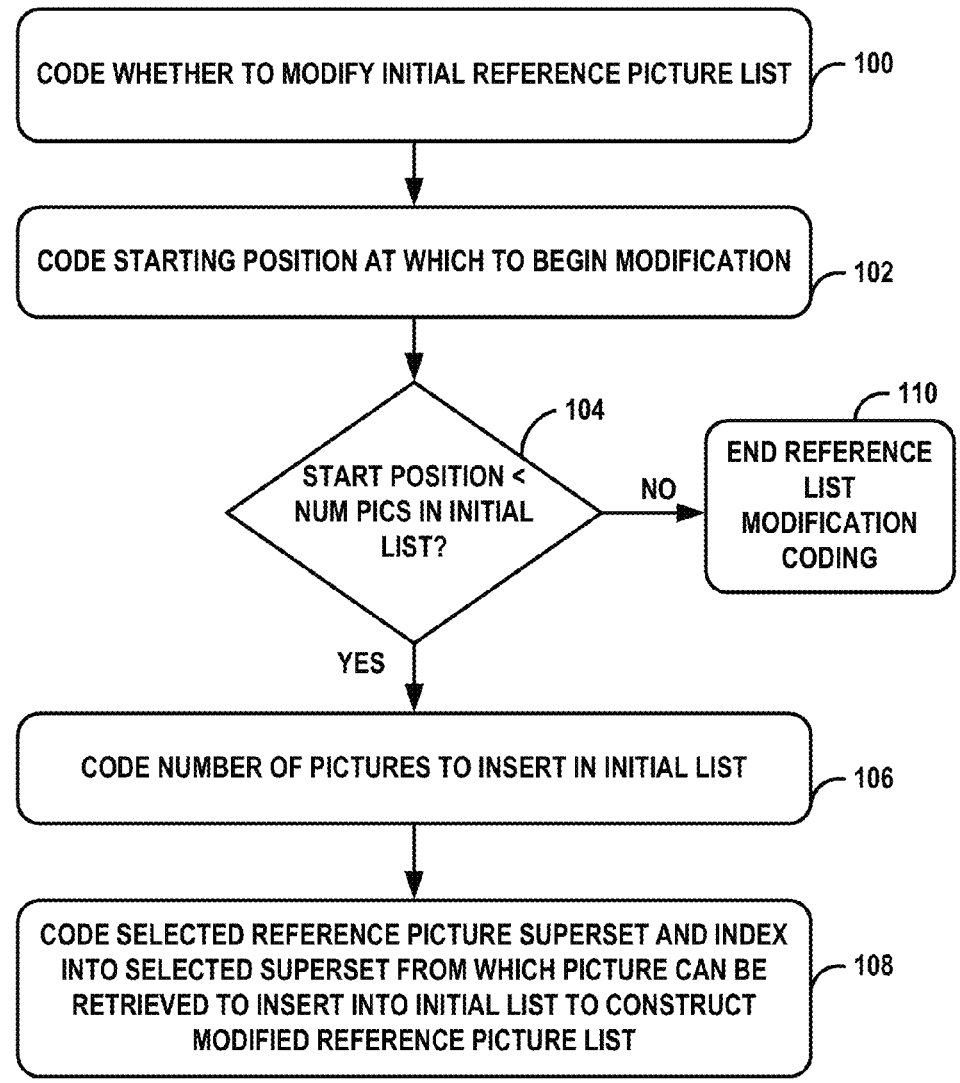
FIG. 5 is a flowchart illustrating an example method of coding information related to reference picture list modification.

FIG. 5 is a flowchart illustrating an example operation of coding whether and how reference picture list modification is to occur in the process of coding video data in accordance with this disclosure. The method of FIG. 5 includes coding information indicating whether an initial reference picture list is to be modified (100) and coding information indicating a starting position in the initial reference picture list constructed based on a reference picture set (102). The reference picture set identifies reference pictures that can be used for inter-predicting one or more pictures included in the video data. The method of FIG. 5 also includes, when the starting position is less than a number of pictures included in the initial reference picture list (104), coding information indicating a number of pictures to be inserted into the initial reference picture list (106), and coding information indicating a selected reference picture superset and an index into the selected reference picture superset from which a picture can be retrieved to insert into the initial reference picture list to construct a modified reference picture list (108). The selected reference picture superset comprises one or more subsets of the reference picture set. In the event that the starting position is not less than a number of pictures included in the initial reference picture list (104), then coding related to reference list modification may be ended (110), in some cases.

Generally speaking, video encoder 20 of source device 12 can be configured to signal parameters that convey whether reference picture list modification should be executed and the manner in which such modification should be carried out. Video decoder 30 of destination device 14 can receive the information coded by video encoder 20 in relation to different coded pictures of a bitstream received from source device 12 and execute reference picture list modification in accordance with the information signaled by video encoder 20. One example according to this disclosure, according to which video encoder 20 may signal such information is represented in the method of FIG. 5. Although the method of FIG. 5 is described below as carried out by video encoder 20, it should be noted that other devices can be configured to execute such operations, including, e.g., video decoder 30.

The method of FIG. 5 includes coding information indicating whether an initial reference picture list is to be modified (100). For example, video encoder 20 can signal one or more syntax elements that indicate whether a reference picture list for a picture currently being coded is to be modified. In one example, video encoder 20 signals a syntax element that indicates whether, for the current picture, one of initial List 0 or initial List 1 is to be modified. For example, video encoder 20 signals a syntax element in the slice header of the current slice of the current picture that indicates whether one of initial List 0 or initial List 1 is to be modified. Video encoder 20 can signal reference picture list modification information in other ways, including, signaling syntax elements related to modification in the picture parameter set (PPS), sequence parameter set (SPS), the picture header (if any), or any combination thereof.

In one example, video encoder 20 signals a ref_pic_list_modification_flag_1X syntax element to indicate whether a particular reference picture list is to be modified in the process of coding the current picture or a portion thereof, e.g., a slice of the current picture. The "X" in ref_pic_list_modification_flag_10 can, in some examples, be equal to 0 or 1 and indicates whether reference picture list X is to be modified. For example, video encoder 20 can signal ref_pic_list_modification_flag_10 to indicate modification of List 0 and ref_pic_list_modification_flag_l1 to indicate modification of List 1. Video encoder can signal the syntax element ref_pic_list_modification_flag_1X as equal to 0 or 1. The syntax element ref_pic_list_modification_flag_1X equal to 1 specifies the initial List X is to be modified. The syntax element ref_pic_list_modification_flag_1X equal to 0 specifies that the initial List X is not to be modified and hence the final List X is the same as the initial List X.

Referring again to FIG. 5, the example method includes coding information indicating a starting position in the initial reference picture list constructed based on a reference picture set (102). In the event that an initial reference picture list for the current picture is to be modified, video encoder 20 codes a starting position in the initial list from which to begin modification. The starting position corresponds to an index into the initial reference picture list.

As described above, in some examples, video encoder 20 does not expressly signal information indicating a starting position in the initial reference picture list. Video encoder 20 does, however, in such an example, signal the number of pictures to be inserted into the initial reference picture list. In the event the starting position is not signaled by video encoder 20, video decoder 30 can infer the starting position for reference picture list modification to be the first index position in the reference picture list, e.g., index 0.

Referring again to coding information indicating a starting position in the initial reference picture list constructed based on a reference picture set (102) in the example of FIG. 5, video encoder 20 may signal a start_pos_1X syntax element to indicate the index position in initial List X at which to begin modification. In such a case, entries in initial List X with a position smaller than start_pos_1X will not be modified. The value of start_pos_1X can be in the range from 0 to the number of pictures in initial List X. In some cases, video encoder 20 may not explicitly signal the start_pos_1X syntax element, in which case video decoder 30 infers the starting position for modification to be equal to 0.

As a check on the validity of the value of the start_pos_1X syntax element, video encoder 20 may compare start_pos_1X to the number of active pictures in initial List X (104). In the event that the starting position is not less than a number of pictures included in the initial reference picture list (104), then video encoder 20 may, in some cases, end coding related to reference list modification (110). When, however, the starting position is less than a number of active pictures included in the initial reference picture list (104), video encoder 20 is configured to code: information indicating a number of pictures to be inserted into the initial reference picture list (106); and information indicating a selected reference picture superset and an index into the selected reference picture superset from which a picture can be retrieved to insert into the initial reference picture list to construct a modified reference picture list (108).

As noted above and illustrated in FIG. 5, when the starting position signaled by video encoder 20 is less than a number of active pictures included in the initial reference picture list that is to be modified, video encoder 20 codes information indicating a number of pictures to be inserted into the initial reference picture list. In one example, video encoder 20 codes a num_inserted_pics_1X syntax element. In one example, the num_inserted_pics_1X syntax element indicates the number of times a video coder, e.g. decoder 30 is instructed to iteratively retrieve and insert a reference picture into the initial reference picture list X to construct a modified list X. The value of num_inserted_pics_1X can be in the range from 0 to the number of active pictures in initial List X—start_pos_1X, inclusive. It is noted that the number of active pictures in initial List X referred to in this and other examples may be signaled by video encoder 20 as a num_ref_idx_1X_active syntax element. In any event, when not present, the value of num_inserted_pics_1X can be inferred, e.g., by video decoder 30, to be equal to the number of active pictures in initial List X, thereby indicating that all of the pictures in initial List X with index greater than or equal to start_pos_1X in the initial list may be replaced to construct a modified List X.

When the starting position signaled by video encoder 20 is less than a number of active pictures included in the initial reference picture list that is to be modified, video encoder 20 also codes information indicating a selected reference picture superset and an index into the selected reference picture superset from which a picture can be retrieved to insert into the initial reference picture list to construct a modified reference picture list. In one example, video encoder 20 codes a source_list_idx_1X syntax element, which indicates a particular reference picture superset from which to retrieve a picture to insert into initial List X in the current position. The current position of initial List X will start with start_pos_1X and increment by 1 for num_inserted_pics_1X. In such a case, video encoder 20 also codes a ref_pic_set_idx_1X syntax element, which indicates an index into the source_list_idx_1X reference picture superset at which the picture to insert into initial List X can be retrieved.

Table 1 provided below is an example of a syntax structure that may be used by video encoder 20 to code information regarding reference picture list modification in accordance with this disclosure. The structure provided in Table 1 including the IF statements and WHILE loop will be described in more detail with reference to FIG. 6 and the manner in which a video coder, e.g., video decoder 30 executes reference picture list modification in accordance with syntax elements signaled by video encoder 20.

TABLE 1

| ref_pic_list_modification( X ) { | Descriptor |
|---|---|
|   ref_pic_list_modification_flag_lX | u(1) |
|   if( ref_pic_list_modification_flag_lX ) { | |
|     start_pos_lX | u(v) |
|     if( start_pos_lX < num_ref_idx_lX_active_minus1 ) | |
|       num_inserted_pics_lX_minus1 | ue(v) |
|     for( i =0 ; i < NumReorderedPicsX; i++ ) { | |
|       if( NumberSourceRPS > 1 ) | |
|         source_list_idx_lX[ i ] | u(v) |
|       if( NumPicsInRpsSubset[ i ] > 1 ) | |
|         ref_pic_set_idx_lX[ i ] | u(v) |
|     } | |
|   } | |
| } | |

Table 1 includes a number of syntax elements that can be coded by video encoder 20 to signal reference picture list modification for a number of reference picture lists, including List 0 and List 1, also referred to as RefPicList0 and RefPicList1. Table 1 also indicates a number of descriptors associated with particular syntax elements. For example, ref_pic_list_modification_flag_1X is associated with descriptor u(1), start_pos_1X is associated with descriptor u(v), num_inserted_pics_1X_minus1 is associated with descriptor ue(v), and both source_list_idx_1X and ref_pic_set_idx_1X are associated with descriptor u(v). The descriptors provided in Table 1 are examples of the particular manner in which a video coder, e.g., video encoder 20 can code the ranges of values associated the syntax elements indicative of reference picture list modification.

Video encoder 20 can code syntax elements related to reference picture list modification (and other operations) in a number of different ways. One coding method that can be employed by video encoder 20 in accordance with this disclosure is context adaptive variable length coding (CAVLC). To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As part of the video decoding process, video decoder 30 parses syntax elements generated by video encoder 20. Each syntax element has an associated descriptor that describes the formalities of how the syntax element is to be formatted by video encoder 20 and how the syntax element is to be parsed by video decoder 30. Accordingly, for any given syntax elements, video encoder 20 encodes the syntax element in accordance with an associated descriptor, and video decoder 30 parses the syntax element in accordance with the associated descriptor. The descriptor for a particular syntax element may, for example, be defined in a coding standard implemented by both video decoder 30 and video encoder 20 and does not necessarily constitute part of the transmitted bitstream. Examples of descriptors used in the current HEVC standard include the following:

ae(v): context-adaptive arithmetic entropy-coded syntax element.

b(8): byte having any pattern of bit string (8 bits). The parsing process for this descriptor is specified by the return value of the function read_bits(8).

ce(v): context-adaptive variable-length entropy-coded syntax element with the left bit first.

f(n): fixed-pattern bit string using n bits written (from left to right) with the left bit first. The parsing process for this descriptor is specified by the return value of the function read_bits(n).

i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first.

me(v): mapped Exp-Golomb-coded syntax element with the left bit first.

se(v): signed integer Exp-Golomb-coded syntax element with the left bit first.

te(v): truncated Exp-Golomb-coded syntax element with left bit first.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer Exp-Golomb-coded syntax element with the left bit first.

In the list of descriptors above, "n" generally refers to a fixed number of bits, while "v" generally refers to a variable number of bits. The parsing processes for the various descriptors listed above can be found in the High-Efficiency Video Coding (HEVC) standard, being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC, and referred to as HEVC WD10 hereinafter, is available, as of Jan. 25, 2013, from http://phenix.int-evey.fr/jct/doc_end user/documents/12_Geneva/wg11/JCTVC-L1003-v9.zip, which is hereby incorporated by reference in its entirety.

The techniques of this disclosure include introducing a new descriptor for syntax elements, which may be used to code syntax elements related to reference picture list modification including some of those illustrated in Table 1. This disclosure refers to this new descriptor as "ur(v)." The "ur(v)" descriptor may, for example, be used for syntax elements that are bound by an integer range of values. In general, ur(v) represents an unsigned integer using n-bits. The number of bits can vary dependent on the range of the syntax elements. For example, if the range of values is integers from −3 to 4, then ur(v) can be a 3-bit value because the range of −3 to 4 includes 8 integer values. If the value is −4 to 5, then ur(v) can be a 4-bit value because the range of −4 to 5 includes 10 integer values. In this manner, the number of bits for ur(v) is fixed for a particular range but may vary depending on the range.

The new ur(v) descriptor for syntax elements introduced in this disclosure may, in some instances, be used for syntax elements that currently use one of the descriptors described above. By using the ur(v) descriptor instead of one of the descriptors described above, coding efficiency may, in some instances, be improved. For example, the ur(v) descriptor may offer improved efficiency compared to the ue(v) descriptor when the range of values for a syntax element is relatively small. In other instances, the ur(v) descriptor may offer improved efficiency compared to the u(v) descriptor in cases where there is only one value for a syntax element.

In a video coding specification such as HEVC, the descriptor ur(v) may be used for syntax elements where there is a value range for the syntax element. Accordingly, the ur(v) descriptor introduced in this disclosure may be used in some instances for syntax elements that currently use the ue(v), u(v), i(v), i(n), se(v), or other descriptors.

Video decoder 30 can parse a ur(v) syntax element as follows:

When the range of the syntax element is from 0 to m−1, inclusive, ur(v) has the same value as u(n) when the number of bits is equal to ceil(log 2(m)). The function ceil(log 2(m)) generally represents a function for converting a floating value to a next highest integer value.

When the syntax element is always 0, no bit is actually signaled and the value of the syntax element is equal to 0.

When the range of the syntax element is from a to b, inclusive, ur(v) has the same value as a+u(v), wherein the number of bits is equal to ceil(log 2((b−a)+1)). Note that both a and b are integer and b is larger than a.

When the range of the syntax element is always a, no bit is actually signaled and the value of the syntax element is equal to a.

Table 1 above shows an example of reference picture list modification syntax that does not use the ur(v) descriptor described in this disclosure. Table 2 below, in contrast, shows an example of reference picture list modification syntax that utilizes ur(v) descriptor described in this disclosure. The ur(v) descriptor can potentially be used with a wide array of syntax elements used in the video coding process other than those related to reference picture list modification. These syntax elements may, for example, be in sequence headers, picture headers, slice headers, or any other portion of a video bitstream.

Table 2 below shows an example of reference picture list modification syntax that utilizes ur(v) descriptor described in this disclosure. As can be seen by comparing Table 1 to Table 2, the use of the ur(v) descriptor may, in some instances result in a simplification to the syntax.

TABLE 2

| ref_pic_list_modification( X ) { | Descriptor |
|---|---|
|   ref_pic_list_modification_flag_lX | u(1) |
|   if( ref_pic_list_modification_flag_lX ) { | |
|     start_pos_lX | u(v) |
|     if( start_pos_lX < num_ref_idx_lX_active_minus1 ) | |
|       num_inserted_pics_lX_minus1 | ue(v) |
|     for( i =0 ; i < NumReorderedPicsX; i++ ) { | |
|       source_list_idx_lX[ i ] | ur(v) |
|       ref_pic_set_idx_lX[ i ] | ur(v) |
|     } | |
|   } | |
| } | |

In addition to the VLC methods indicated for particular syntax elements in Table 1 and Table 2 above, video encoder 20 can use alternative methods in some cases. For example, video encoder 20 can code start_pos_1X using ue(v) or te(v). In one example, video encoder 20 encodes num_inserted_pics_1X_minus1 as u(v) and the length of num_inserted_pics_1X_minus1 is Ceil(log 2(num_ref_idx_1X_active_minus1+1−start_pos_1X)) bits. In one example, num_inserted_pics_1X_minus1 is coded by video encoder 20 using te(v).

In one example, video encoder 20 encodes at least one of the syntax elements num_inserted_pics_1X_minus1, source_list_idx_1X and ref_pic_set_idx_1X using te(v) instead of u(v). In one example, video encoder 20 encodes at least one of the syntax elements num_inserted_pics_1X_minus1, source_list_idx_1X and ref_pic_set_idx_1X using ue(v) instead of u(v). Additionally, in one example, video encoder 20 encodes the syntax element source_list_idx_1X as a 1-bit flag.

As noted above, the ur(v) descriptor can potentially be used with a wide array of syntax elements used in the video coding process other than those related to reference picture list modification. One example of such use of the ur(v) descriptor outside of reference picture list modification is provided in Table 3 below. Table 3 shows an example of reference picture lists combination syntax using the ur(v) descriptor as described in this disclosure. Reference picture list combination may be employed by a video coder to combine multiple reference picture lists for use in coding a current picture or portion thereof.

TABLE 3

| ref_pic_list_combination( ) { | Descriptor |
|---|---|
|   if( slice_type == B ) { | |
|     ref_pic_list_combination_flag | u(1) |
|     if( ref_pic_list_combination_flag ) { | |
|       num_ref_idx_lc_active_minus1 | ue(v) |
|       ref_pic_list_modification_flag_lc | u(1) |
|       if( ref_pic_list_modification_flag_lc ) | |
|         for ( i =0; | |
|         i <= num_ref_idx_lc_active_minus1; i++ ) { | |
|           pic_from_list_0_flag[i] | u(1) |
|           ref_idx_list_curr[j][i] | ur(v) |
|         } | |
|     } | |
|   } | |
| } | |

In the example of Table 3, pie_from_list_0_flag[i] indicates the i-th reference picture added into the reference picture lists combination is from reference picture list 0 or reference picture list 1. When this flag is equal to 1, the picture is from the reference picture list 0, and the CurrRefPicList is reference picture list 0; when this flag is equal to 0, the picture is from the reference picture list 1, and the CurrRefPicList is reference picture list 1. Additionally, ref_idx_list_curr[j][i] indicates the reference index of the i-th picture in the reference picture list j (with j equal to 1−pic_from_list_0_flag[i]) to be appended at the end of the reference picture lists combination. The value of ref_idx_list_curr[j][i] is in the range of 0 to num_ref_idx_1X_active_minus1 (with X equal to j), inclusive. Note that when num_ref_idx_1X_active_minus1 is equal to 0, the number of bits for coding of ref_idx_list_curr[j][i] is 0, i.e., the syntax element ref_idx_list_curr[j][i] is not present.

In addition to the foregoing techniques for coding information related to reference picture list modification, video encoder 20 may employ alternative methods for coding reference list modification, which can, in turn, be used by video decoder 30 to execute such modification in the process of decoding a picture or portion thereof. In one example, video encoder 20 codes the same syntax elements described above with reference to the example method of FIG. 5 and shown in Table 1, and adds an additional syntax element that indicates how many times to iteratively insert a reference picture into initial List X to construct a modified reference picture list X. In one example, video encoder 20 codes a syntax element pics_inserted_flag_1X indicating how many times to iteratively insert a reference picture into initial List X to construct a modified reference picture list X.

Table 4 below shows an example of reference picture list modification syntax that pics_inserted_flag_1X in accordance with this disclosure. As can be seen by comparing Table 1 to Table 4, the use of pics_inserted_flag_1X may, in some instances result in a simplification to the syntax.

TABLE 4

| ref_pic_list_modification( X ) { | Descriptor |
|---|---|
|   ref_pic_list_modification_flag_lX | u(1) |
|   if( ref_pic_list_modification_flag_lX ) { | |
|     pics_inserted_flag_lX | u(1) |
|     start_pos_lX | u(v) |
|     if( pics_inserted_flag_lX ) | |
|       num_inserted_pics_lX_minus1 | u(v) |
|     for( i =0 ; i < NumReorderedPicsX; i++ ) { | |
|       if( NumberSourceRPS >1 ) | |
|         source_list_idx_lX[ i ] | u(v) |
|       if(NumPicsInRpsSubset[ i ] > 1 ) | |
|         ref_pic_set_idx_lX[ i ] | u(v) |
|     } | |
|   } | |
| } | |

In one example, pics_inserted_flag_1X equal to 1 indicates that less than num_ref_idx_1X_active_minus1+1 entries are signalled in the loop in this syntax structure ref_pic_list_modification(X). The syntax element pics_inserted_flag_1X equal to 0 indicates that num_ref_idx_1X_active_minus1+1 entries are signalled in the loop in the syntax structure ref_pic_list_modification(X). In some cases, video encoder 20 does not signal pics_inserted_flag_1X, the value of which is then inferred to be 0. Additionally, in some cases, video encoder 20 does not signal start_pos_1X, the value of which is then inferred to be 0.

In the syntax structure of Table 4, num_inserted_pics_1X_minus1 plus 1 specifies the number of entries signaled in the loop in this syntax structure ref_pic_list_modification(X). The value of num_inserted_pics_1X_minus1 is in the range of 0 to num_ref_idx_1X_active_ minus1−1−start_pos_1X, inclusive. In one example, video encoder can code num_inserted_pics_1X_minus1 using ue(v), u(v) or te(v). When not present, the value of num_inserted_pics_1X_minus1 can be inferred, e.g., by video decoder 30 to be equal to num_ref_idx_1X_active_ minus1−start_pos_1X. In one example, the value of num_inserted_pics_1X_minus1 is signaled by video encoder 30 using Ceil(log 2(num_ref_idx_1X_active_minus1− start_pos_1X)) bits. In one example, if pics_inserted_ flag_1X is not present and num_inserted_pics_1X_minus1 is equal to num_ref_idx_1X_active_minus1, then each picture identified in an entry to the loop is simply put to the current index position in List X, and the current index position is increased, while shifting the position of any other remaining pictures to later in the list is not performed.

In another example, video encoder 20 may employ the ur(v) VLC method described above in an example including the additional pics_inserted_flag syntax element. Table 5 below shows an example of reference picture list modification syntax including the pics_inserted_flag_1X, which utilizes the ur(v) descriptor described in this disclosure.

TABLE 5

| ref_pic_list_modification( X ) { | Descriptor |
| --- | --- |
| ref_pic_list_modification_flag_lX | u(1) |
| if( ref_pic_list_modification_flag_lX) { | |
| pics_inserted_flag_lX | u(1) |
| start_pos_lX | u(v) |
| if( pics_inserted_flag_lX ) | |
| num_inserted_pics_lX | u(v) |
| for( i =0 ; i < NumReorderedPicsX; i++ ) { | |
| source_list_idx_lX[i] | ur(v) |
| ref_pic_set_idx_lX[i] | ur(v) |
| } | |
| } | |
| } | |

Figure 6:
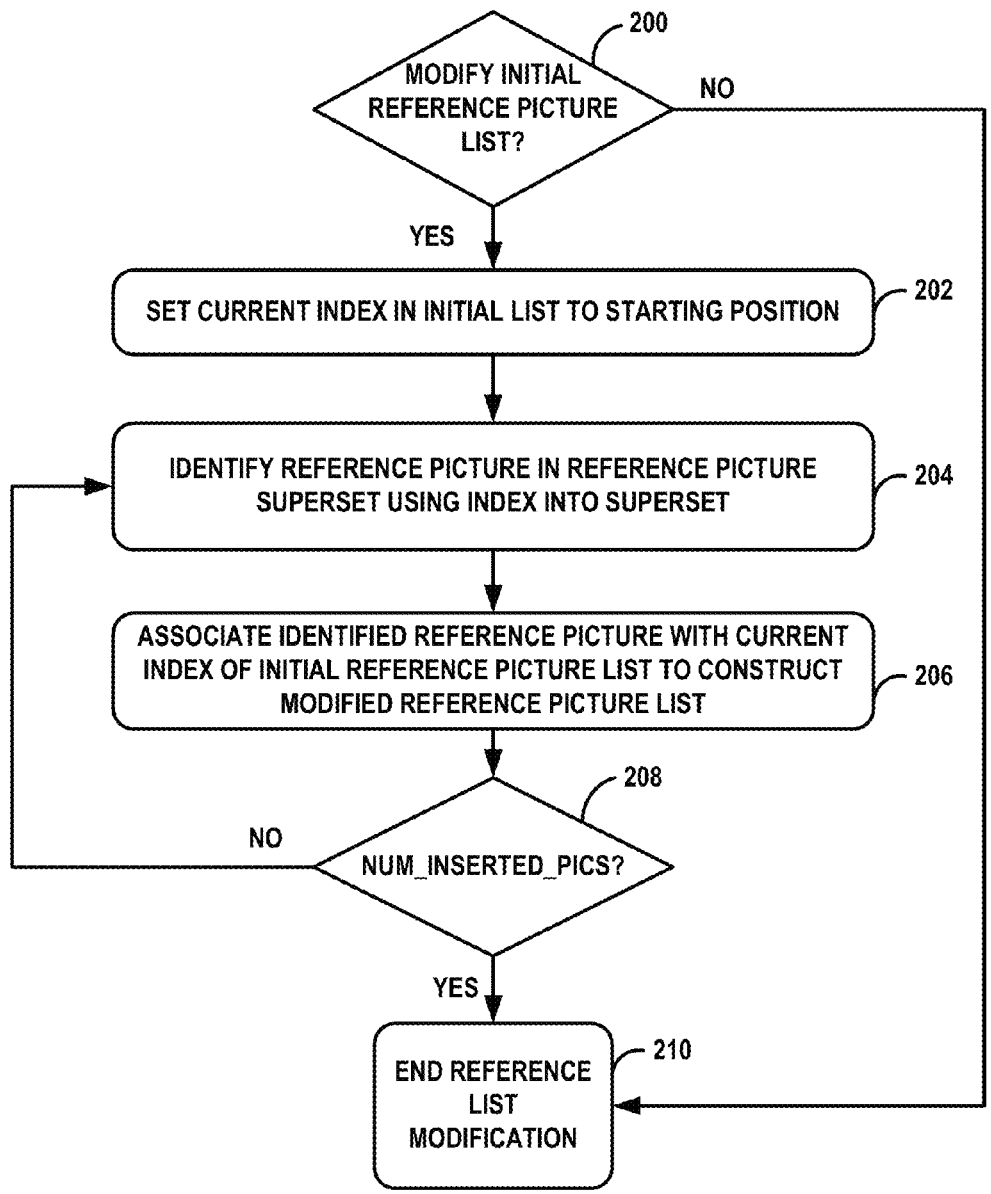
FIG. 6 is a flowchart illustrating an example method of modifying a reference picture list.

FIG. 6 is a flowchart illustrating an example method of modifying a reference picture list in accordance with this disclosure. The method of FIG. 6 includes determining whether an initial reference picture list is to be modified (200) and, if so, setting a current index position in the initial list to a starting position (202). The method of FIG. 5 also includes, for a number of times equal to the number of pictures to be inserted (208): identifying a reference picture in a selected reference picture superset using an index into the selected reference picture superset (204) and associating the identified reference picture with the current index of the initial reference picture list to construct the modified reference picture list.

Generally speaking, video decoder 30 of destination device 14 receives information regarding reference list modification from video encoder 20, including, in some cases, some or all of the example syntax elements and structure described above. Additionally, video decoder 30 executes reference picture list modification in accordance with the information signaled by video encoder 20. One example according to this disclosure, according to which video decoder 30 may execute reference picture list modification operations is represented in the method of FIG. 6. Although the method of FIG. 6 is described below as carried out by video decoder 30, it should be noted that other devices can be configured to execute such operations, including, e.g., video encoder 20.

The method of FIG. 6 includes video decoder 30 determining whether an initial reference picture list is to be modified (200). As part of the process of decoding of slices (or any other portion) within a picture, video decoder 30 constructs one or more reference picture lists. In some cases, video decoder 30 constructs two reference picture lists, which are sometimes referred to as List 0 and List 1 or RefPicList0 and RefPicList1, respectively. As described in detail above, video decoder 30 also constructs a reference picture set and subsets thereof, which, among other functions, include reference pictures that may be selected for listing in List 0 and/or List 1.

Regardless of the particular manner in which video decoder 30 constructs the reference picture set and subsets and the initial reference picture lists, after such operations, video decoder 30 determines whether an initially constructed reference list or lists is/are to be modified. For example, video decoder 30 decodes the ref_pic_list_modification_flag_1X syntax element described above to determine whether initial List X is to be modified. In one example, ref_pic_list_ modification_flag_1X equal to 1 indicates that the initial List X is to be modified, while ref_pic_list_modification_flag_1X equal to 0 indicates that the initial List X is not to be modified.

In the event that video decoder 30 determines that the initial reference picture list is to be modified, decoder 30 sets the current index position in the initial list to the signaled starting position, indicated, e.g., by start_pos_1X. Video decoder 30 then iteratively identifies a reference picture in a selected reference picture superset using an index into the selected reference picture superset and associates the identified reference picture with the current index of the initial reference picture list to construct a modified reference picture list. Video decoder 30 can repeat the reference picture insertion process for a number of times equal to a signaled number of pictures to be inserted into the initial list.

In some cases, the starting position at which to begin reference picture list modification is not explicitly signaled by video encoder 20. In one example in which the starting position, e.g., start_pos_1X syntax element is not signaled, video decoder 30 infers that the starting position for reference picture list modification is the first index, e.g., index 0 of the initial reference picture list. Then, video decoder 30 can insert into the initial list, starting at index 0, the signaled number of pictures to be inserted to construct the modified list.

With reference to the syntax of Table 1, it is noted that the syntax element NumReorderedPicsX used in the WHILE loop is derived to be equal to num_inserted_pics_1X_ minus1+1. Additionally, in some cases, video encoder 20 can signal num_inserted_pics_1X, which is equivalent to num_inserted_pics_1X_minus1+1.

As noted above, when the starting position signaled by video encoder 20 is less than a number of pictures included in the initial reference picture list, then video encoder 20 also signals the number of pictures to be inserted into the initial reference picture list to construct a modified reference picture list. In one example, video encoder 20 signals the num_inserted_pics_1X syntax element to indicate the number of pictures video decoder 20 should insert in List X. The number of pictures to be inserted into the initial reference picture list is used by video decoder 30 as a counter for a loop that iteratively inserts reference pictures into the initial reference picture list to construct the modified reference picture list, as illustrated in FIG. 6.

In one example, video decoder 30 iteratively identifies a reference picture in the selected reference picture superset using the index into the selected reference picture superset signaled by video encoder 20. After video decoder 30 iteratively identifies the reference picture in the selected reference picture superset, video decoder 30 associates the identified reference picture with a current index of the initial reference picture list to construct the modified reference picture list. Video decoder 30 starts this process at the starting position signaled by video encoder 20 and repeats the process for a number of times equal to the number of pictures to be inserted into the initial reference picture list also signaled by video encoder 20.

As described above, the source from which pictures can be retrieved by video decoder 30 to insert into an initial reference picture list is constructed based on the previously derived reference picture set and subsets thereof. As noted above, candidate reference picture supersets from which pictures can be retrieved to insert into the initial reference picture list can include one or more subsets of the reference picture set. Combinations of reference picture subsets upon which candidate reference picture supersets may be based include a combination of the RefPicSetStCurrBefore subset and the RefPicSetStCurrAfter subset, at least one of the RefPicSetStCurr0, RefPicSetStCurrBefore, RefPicSetStCurr1, and RefPicSetStCurrAfter subsets, a combination of the RefPicSetStCurr0, RefPicSetStCurr1, RefPicSetStFoll0, RefPicSetStFoll1, RefPicSetLtCurr, and RefPicSetLtFoll subsets, as well as, in cases where inter-view prediction is available, an inter-view reference picture subset of the reference picture set.

In one example, video decoder 30 constructs candidate reference pictures sources (e.g. supersets) for reference picture list modification in accordance with the following examples. The following examples references syntax elements from Table 1 provided above. Additionally, it is noted that the selected source of reference pictures used for reference picture list modification is referred to in the following examples by the syntax element RpsSubset. The syntax element RpsSubset may represent the candidate and/or selected reference picture superset referred to in other examples described in this disclosure.

In one example, video decoder 30 constructs the following candidate reference picture sources based on the reference picture set already derived for the current picture in the following order:
1. Let i be equal to 0.
2. Let RefPicSetSt be the union of RefPicSetStCurrBefore and RefPicSetStCurrAfter, and NumRefPicSetSt be the sum of NumPocStCurrBefore and NumPocStCurrAfter. If NumRefPicSetSt is greater than 0, RpsSubset[i] is set to be RefPicSetSt, and NumPicsInRpsSubset[i] is set to be equal to NumRefPicSetSt, then let i be equal to i+1.
3. Let RefPicSetIv be the inter-view reference RPS subset (only present when inter-view prediction is possible), and NumRefPicSetIv be the number of entries in RefPicSetIv. If NumRefPicSetIv is greater than 0, RpsSubset[i] is set to be RefPicSetIv, and NumPicsInRpsSubset[i] is set to be equal to NumRefPicSetIv, then let i be equal to i+1.
4. If NumPocLtCurr is greater than 0, RpsSubset[i] is set to be RefPicSetLtCurr, and NumPicsInRpsSubset[i] is set to be equal to NumPocLtCurr. Let i be equal to i+1.
5. Let NumberSourceRPS be equal to i.

In another example, video decoder 30 constructs the following candidate source RPS subsets in the following order for RefPicListX (List X), if present:
1. Let i be equal to 0.
2. Let RefPicSetStCurr0 be RefPicSetStCurrBefore, RefPicSetStCurr1 be RefPicSetStCurrAfter, NumPocStCurr0 be equal to NumPocStCurrBefore, and NumPocStCurr1 be equal to NumPocStCurrAfter.
3. If NumPocStCurrX is greater than 0, RpsSubset[i] is set to be RefPicSetStCurrX, and NumPicsInRpsSubset[i] is set to be equal to NumPocStCurrX, then let i be equal to i+1.
4. If NumPocStCurr(1−X) is greater than 0, RpsSubset[i] is set to be RefPicSetStCurr(1−X), and NumPicsInRpsSubset[i] is set to be equal to NumPocStCurr(1−X), then let i be equal to i+1.
5. Let RefPicSetIv be the inter-view reference RPS subset (only present when inter-view prediction is possible), and NumRefPicSetIv be the number of entries in RefPicSetIv. If NumRefPicSetIv is greater than 0, RpsSubset[i] is set to be RefPicSetIv, and NumPicsInRpsSubset[i] is set to be equal to NumRefPicSetIv, then let i be equal to i+1.
6. If NumPocLtCurr is greater than 0, RpsSubset[i] is set to be RefPicSetLtCurr, and NumPicsInRpsSubset[i] is set to be equal to NumPocLtCurr, then let i be equal to i+1.
7. Let NumberSourceRPS be equal to i.

For the above two examples, the step 3 or 5, respectively, in the two examples relating to RefPicSetIv may be moved to be step 2. Additionally, in another example, video decoder 30 constructs one reference picture source, RpsSubset[0] as including all possible reference pictures, and sets NumPicsInRpsSubset[0] to the number of entries in RpsSubset[0]. In this case, the syntax element source_list_idx_1X is not present in the syntax structure ref_pic_list_modification(X) shown in Table 1. In another example, if both long-term reference picture subset(s) and inter-view reference picture subset(s) co-exist, long-term reference subset(s) is in front of inter-view reference picture subset(s), e.g., the steps relating to RefPicSetLtCurr are before steps relating to RefPicSetIv.

It was noted above with reference to coding syntax elements related to reference picture list modification that video encoder 20 may encode the syntax element source_list_idx_1X as a 1-bit flag. In some cases, video encoder 20 may code source_list_idx_1X as a 1-bit flag if there are only two values and if the number of reference picture subsets that form RefPicSetCurrUnion, e.g., NumberSourceRPS is equal to 2.

In the process of inserting pictures into the initial reference picture list, video decoder 30 may shift the index values of the existing pictures of the initial list. In one example, for each iteration of identifying a reference picture to insert and associating the reference picture with the current index of the initial reference picture list, video decoder 30 increases by one the index of the picture associated with the current index in the initial reference picture list before the identified reference picture was associated with the current index and any pictures associated with an index in the initial reference picture list that is greater than the current index.

For example, the initial reference picture list may include five reference pictures picture 1, picture 2, picture 3, picture 4, and picture 5 indexed at index 1, index 2, index 3, index 4, and index 5, respectively. Video encoder 20 signals a starting position for reference picture list modification equal to index 2 in the initial reference picture list and also signals that 2 pictures are to be inserted into the initial list to construct the modified reference picture list. In such a case, video decoder 30 iteratively identifies two pictures from the selected reference picture superset to insert into the initial reference picture list and associates the first identified picture with index 2 and the second identified picture with index 3. After inserting the identified pictures, the modified reference picture list includes picture 1, inserted picture 1, inserted picture 2, picture 2, picture 3, picture 4, and picture 5. Video decoder 30 can shift the index values of the original pictures of the initial list such that picture 1, inserted picture 1, inserted picture 2, picture 2, picture 3, picture 4, and picture 5 of the modified reference picture list are associated with index values of index 1, index 2, index 3, index 4, index 5, index 6, and index 7, respectively.

The procedure employed by video decoder 30 for placing a picture into the current index position in a reference picture list and shifting the position of any other remaining pictures to later in the list and increasing the current index position may be, in some cases, similar or the same as described in HEVC WD9 hereinafter, is available, as of Dec. 18, 2012, from http://phenix.int-evry.fr/jct/doc_end user/documents/11_Shanghai/wg11/JCTVC-K1003-v13.zip.

In some cases, the number of pictures that can be included in a reference picture list used for inter-predicting a picture may be limited. For example, video encoder 20 signals a maximum number of pictures allowed in a reference picture list, which video decoder 30, in turn, references when initializing and modifying reference picture lists. In one example, after inserting a number of reference pictures into the initial reference picture list based on the starting position and number of reference pictures to be inserted information coded by video encoder 20, video decoder 30 truncates the modified reference picture list such that the number of pictures included in the list does not exceed the maximum of pictures allowed in a reference picture list.

For example, video encoder 20 truncates the modified reference picture list such that any pictures associated with an index that is greater than a maximum number of pictures allowed in a reference picture list are removed from the modified reference picture list. With reference to the reference picture list modification example described above, video decoder 20 removes picture 4 and picture 5 (of the initial reference picture list) associated with index 6 and index 7 from the modified reference picture list such that the modified reference picture list includes picture 1, inserted picture 1, inserted picture 2, picture 2, and picture 3 associated with index 1, index 2, index 3, index 4, and index 5, respectively.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
    constructing, for encoding a current picture of the video data, a plurality of reference picture subsets that together form a reference picture set, wherein the reference picture set identifies reference pictures that can be used for inter-predicting one or more pictures included in the video data, wherein the reference picture subsets includes at least two of:
        a RefPicSetStCurrBefore subset, a RefPicSetStCurrAfter subset, a RefPicSetStFoll subset, a RefPicSetLtCurr subset, or a RefPicSetLtFoll subset,
        wherein the RefPicSetStCurrBefore subset includes short-term reference pictures that are displayed before the current picture being encoded and can be used to inter-predict the current picture and pictures following the current picture in decoding order,
        wherein the RefPicSetStCurrAfter subset includes short-term reference pictures that are displayed after the current picture being encoded and can be used to inter-predict the current picture and pictures following the current picture in decoding order,
        wherein the RefPicSetStFoll subset includes short-term reference pictures that can be used to inter-predict pictures following the current picture in decoding order and not the current picture being encoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

constructing a plurality of reference picture supersets, wherein each of the reference picture supersets is a combination of two or more of the reference picture subsets;

constructing an initial reference picture list, different than the plurality of reference picture supersets, based on one or more of the reference picture subsets;

coding information indicating a starting position in the initial reference picture list;

coding information indicating a number of pictures to be inserted into the initial reference picture list;

coding information indicating a selected reference picture superset from the plurality of reference picture supersets and an index into the selected reference picture superset from which a picture can be retrieved for insertion into the initial reference picture list to construct a modified reference picture list; and encoding the current picture of the video data based on the modified reference picture list.

2. The method of claim 1, further comprising coding information indicating whether the initial reference picture list is to be modified, and wherein the starting position indicates a position at which to begin modification of the initial reference picture list.

3. The method of claim 1, further comprising coding information indicating a number of times to repeatedly:

identify a reference picture in the selected reference picture superset; and associate the identified reference picture with a respective index of the initial reference picture list to construct the modified reference picture list.

4. The method of claim 3, wherein coding the information indicating the number of times to repeatedly identify the reference picture and associating the identified reference picture comprises coding a pics_inserted_flag syntax element that indicates that the number of times to repeatedly identify the reference picture and associating the identified reference picture is less than a number of pictures in the initial reference picture list.

5. The method of claim 1, wherein coding the information indicating the starting position comprises coding a start_pos syntax element that indicates an index position at which to begin modification of the initial reference picture list.

6. The method of claim 1, wherein coding the information indicating a number of pictures to be inserted into the initial reference picture list comprises coding a num_inserted_pics syntax element that indicates the number of pictures to be inserted into the initial reference picture list, and wherein coding the information indicating the selected reference picture superset and the index into the selected reference picture superset comprises:

coding a source_list_idx syntax element that indicates the selected reference picture superset from which the picture can be retrieved; and coding a ref_pic_set_idx syntax element that indicates the index into the selected reference picture superset at which the picture can be retrieved for insertion into the initial reference picture list to construct the modified reference picture list.

7. The method of claim 6, wherein coding at least one of the source_list_idx and the ref_pic_set_idx syntax element comprises coding at least one of the source_list_idx and the ref_pic_set_idx syntax element as ur(v) representing an unsigned integer using v bits, wherein v varies based on a range of values for the at least one of the source_list_idx and the ref_pic_set_idx syntax element.

8. A method for decoding video data, the method comprising:

constructing, for decoding a current picture of the video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being decoded and can be used to inter-predict the current picture and pictures following the current picture in decoding order, wherein the RefPicSetStCurrAfter subset includes short-term reference pictures that are displayed after the current picture being decoded and can be used to inter-predict the current picture and pictures following the current picture in decoding order, wherein the RefPicSetStFoll subset includes short-term reference pictures that can be used to inter-predict pictures following the current picture in decoding order and not the current picture being decoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

constructing a plurality of reference picture supersets, each of the reference picture supersets is a combination of two or more of the reference picture subsets;

constructing an initial reference picture list, wherein different than the plurality of reference picture supersets, based on one or more of the reference picture subsets;

setting a current index into the initial reference picture list based on a coded starting position indicating a position at which to begin modification of the initial reference picture list;

determining a number of pictures to be inserted into the initial reference picture list;

determining a selected reference picture superset from the plurality of reference picture supersets based on decoding of information indicating the selected reference picture superset;

identifying, based on the determined number of pictures, one or more reference pictures in the selected reference picture superset using one or more indices into the selected reference picture superset;

associating the identified reference pictures with respective indices of the initial reference picture list, including the current index, to construct the modified reference picture list; and decoding the current picture of the video data based on the modified reference picture list.

9. The method of claim 8, wherein constructing the plurality of reference picture supersets comprises:

combining the RefPicSetStCurrBefore subset and the RefPicSetStCurrAfter subset of the reference picture set to construct a first reference picture superset; and constructing a second reference picture superset based on an inter-view reference picture subset of the reference picture set.

10. The method of claim 8, wherein constructing one of the plurality of reference picture supersets comprises:

combining the RefPicSetStCurrBefore subset, the RefPicSetStCurrAfter subset, the RefPicSetStFoll subset, the RefPicSetLtCurr subset, and the RefPicSetLtFoll subset of the reference picture set to construct a first candidate reference picture superset.

11. The method of claim 8, further comprising truncating the modified reference picture list such that any pictures associated with an index that is greater than a maximum number of pictures allowed in a reference picture list are removed from the modified reference picture list.

12. A video encoding device comprising:

a memory unit configured to store video data; and a video encoder configured to:

construct, for encoding a current picture of the video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being encoded and can be used to inter-predict the current picture and pictures following the current picture in decoding order, wherein the RefPicSetStCurrAfter subset includes short-term reference pictures that are displayed after the current picture being encoded and can be used to inter-predict the current picture and pictures following the current picture in decoding order, wherein the RefPicSetStFoll subset includes short-term reference pictures that can be used to inter-predict pictures following the current picture in decoding order and not the current picture being encoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

construct a plurality of reference picture supersets, wherein each of the reference picture supersets is a combination of two or more of the reference picture subsets;

construct an initial reference picture list, different than the plurality of reference picture supersets, based on one or more of the reference picture subsets;

code information indicating a starting position in an initial reference picture list;

code information indicating a number of pictures to be inserted into the initial reference picture list;

code information indicating a selected reference picture superset from the plurality of reference picture supersets and an index into the selected reference picture superset from which a picture can be retrieved for insertion into the initial reference picture list to construct a modified reference picture list; and encode the current picture of the video data based on the modified reference picture list.

13. The video encoding device of claim 12, wherein the video encoder is configured to code information indicating a number of times to repeatedly:

identify a reference picture in the selected reference picture superset; and associate the identified reference picture with a respective index of the initial reference picture list to construct the modified reference picture list.

14. The video encoding device of claim 13, wherein the video encoder is configured to code a pics_inserted_flag syntax element that indicates that the number of times to repeatedly identify the reference picture and associating the identified reference picture is less than a number of pictures in the initial reference picture list.

15. The video encoding device of claim 12, wherein the video encoder is configured to code a start_pos syntax element that indicates an index position at which to begin modification of the initial reference picture list.

16. The video encoding device of claim 12, wherein the video encoder is configured to:

code a num_inserted_pics syntax element that indicates the number of pictures to be inserted into the initial reference picture list; and code a source_list_idx syntax element that indicates the selected reference picture superset from which the picture can be retrieved; and code a ref_pic_set_idx syntax element that indicates the index into the selected reference picture superset at which the picture can be retrieved for insertion into the initial reference picture list to construct the modified reference picture list.

17. The video encoding device of claim 16, wherein the video encoder is configured to code at least one of the source_list_idx and the ref_pic_set_idx syntax element as ur(v) representing an unsigned integer using v bits, wherein v varies based on a range of values for the at least one of the source_list_idx and the ref_pic_set_idx syntax element.

18. A video decoding device comprising:

a memory unit configured to store video data; and a video decoder configured to:

construct, for decoding a current picture of the video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being decoded and can be used to inter-predict the current picture and pictures following the current picture in decoding order, wherein the RefPicSetStCurrAfter subset includes short-term reference pictures that are displayed after the current picture being decoded and can be used to inter-predict the current picture and pictures following the current picture in decoding order, wherein the RefPicSetStFoll subset includes short-term reference pictures that can be used to inter-predict pictures following the current picture in decoding order and not the current picture being decoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

construct a plurality of reference picture supersets, wherein each of the reference picture supersets is a combination of two or more of the reference picture subsets;

construct an initial reference picture list, different than the plurality of reference picture supersets, based on one or more of the reference picture subsets;

set a current index into the initial reference picture list based on a coded starting position indicating a position at which to begin modification of the initial reference picture list;

determine a number of pictures to be inserted into the initial reference picture list;

determine a selected reference picture superset from the plurality of reference picture supersets based on decoding of information indicating the selected reference picture superset;

identify, based on the determined number of pictures, one or more reference pictures in the selected reference picture superset using one or more indices into the selected reference picture superset;

associate the identified reference pictures with respective indices of the initial reference picture list, including the current index, to construct the modified reference picture list; and decode the current picture of the video data based on the modified reference picture list.

19. The video decoding device of claim 18, wherein the video decoder is configured to construct the plurality of reference picture supersets at least by:

combining the RefPicSetStCurrBefore subset and the RefPicSetStCurrAfter subset of the reference picture set to construct a first candidate reference picture superset; and constructing a second candidate reference picture superset based on an inter-view reference picture subset of the reference picture set.

20. The video decoding device of claim 18, wherein the video decoder is configured to construct one of the plurality of reference picture supersets at least by:

combining the RefPicSetStCurrBefore subset, the RefPicSetStCurrAfter subset, the RefPicSetStFoll subset, the RefPicSetLtCurr subset, and the RefPicSetLtFoll subset of the reference picture set to construct a first candidate reference picture superset.

21. The video decoding device of claim 18, wherein the video decoder is configured to truncate the modified reference picture list such that any pictures associated with an index that is greater than a maximum number of pictures allowed in a reference picture list are removed from the modified reference picture list.

22. A video encoding device comprising:

means for constructing, for encoding a current picture of video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being encoded and can be used to inter-predict the current picture and pictures following the current picture in decoding order, wherein the RefPicSetStCurrAfter subset includes short-term reference pictures that are displayed after the current picture being encoded and can be used to inter-predict the current picture and pictures following the current picture in decoding order, wherein the RefPicSetStFoll subset includes short-term reference pictures that can be used to inter-predict pictures following the current picture in decoding order and not the current picture being encoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

means for constructing a plurality of reference picture supersets, wherein each of the reference picture supersets is a combination of two or more of the reference picture subsets;

means for constructing an initial reference picture list, different than the plurality of reference picture supersets, based on one or more of the reference picture subsets;

means for coding information indicating a starting position in the initial reference picture list;

means for coding information indicating a number of pictures to be inserted into the initial reference picture list;

means for coding information indicating a selected reference picture superset from the plurality of reference picture supersets and an index into the selected reference picture superset from which a picture can be retrieved for insertion into the initial reference picture list to construct a modified reference picture list; and means for encoding the current picture of the video data based on the modified reference picture list.

23. A video decoding device comprising:

means for constructing, for decoding a current picture of video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being decoded and can be used to inter-predict the current picture and pictures following the current picture in decoding order, wherein the RefPicSetStCurrAfter subset includes short-term reference pictures that are displayed after the current picture being decoded and can be used to inter-predict the current picture and pictures following the current picture in decoding order, wherein the RefPicSetStFoll subset includes short-term reference pictures that can be used to inter-predict pictures following the current picture in decoding order and not the current picture being decoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

means for constructing a plurality of reference picture supersets, wherein each of the reference picture supersets is a combination of two or more of the reference picture subsets;

means for constructing an initial reference picture list, different than the plurality of reference picture supersets, based on one or more of the reference picture subsets;

means for setting a current index into the initial reference picture list based on a coded starting position indicating a position at which to begin modification of the initial reference picture list;

means for determining a number of pictures to be inserted into the initial reference picture list;

means for determining a selected reference picture superset from the plurality of reference picture supersets based on decoding of information indicating the selected reference picture superset;

means for identifying, based on the determined number of pictures, one or more reference pictures in the selected reference picture superset using one or more indices into the selected reference picture superset;

means for associating the identified reference pictures with the respective indices of the initial reference picture list, including the current index, to construct the modified reference picture list; and means for decoding the current picture of the video data based on the modified reference picture list.

24. A non-transitory computer-readable storage medium having stored thereon instructions that when executed cause one or more processors to:

construct, for encoding a current picture of video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being encoded and can be used to inter-predict the current picture and pictures following the current picture in decoding order, wherein the RefPicSetStCurrAfter subset includes short-term reference pictures that are displayed after the current picture being encoded and can be used to inter-predict the current picture and pictures following the current picture in decoding order, wherein the RefPicSetStFoll subset includes short-term reference pictures that can be used to inter-predict pictures following the current picture in decoding order and not the current picture being encoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

construct a plurality of reference picture supersets, wherein each of the reference picture supersets is a combination of two or more of the reference picture subsets;

construct an initial reference picture list, different than the plurality of reference picture supersets, based on one or more of the reference picture subsets;

code information indicating a starting position in the initial reference picture list;

code information indicating a number of pictures to be inserted into the initial reference picture list;

code information indicating a selected reference picture superset from the plurality of reference picture supersets and an index into the selected reference picture superset from which a picture can be retrieved for insertion into the initial reference picture list to construct a modified reference picture list; and encode the current picture of the video data based on the modified reference picture list.

25. A non-transitory computer-readable storage medium having stored thereon instructions that when executed cause one or more processors to:

construct, for decoding a current picture of video data, a plurality of reference picture subsets that together form a reference picture set, wherein the reference picture set identifies reference pictures that can be used for inter-predicting one or more pictures included in the video data, wherein the reference picture subsets includes at least two of:

a RefPicSetStCurrBefore subset, a RefPicSetStCurrAfter subset, a RefPicSetStFoll subset, a RefPicSetLtCurr subset, or a RefPicSetLtFoll subset, wherein the RefPicSetStCurrBefore subset includes short-term reference pictures that are displayed before the current picture being decoded and can be used to inter-predict the current picture and pictures following the current picture in decoding order, wherein the RefPicSetStCurrAfter subset includes short-term reference pictures that are displayed after the current picture being decoded and can be used to inter-predict the current picture and pictures following the current picture in decoding order, wherein the RefPicSetStFoll subset includes short-term reference pictures that can be used to inter-predict pictures following the current picture in decoding order and not the current picture being decoded, wherein the RefPicSetLtCurr subset includes long-term reference pictures that can be used to inter-predict the current picture and pictures following the current picture in decoding order, and wherein the RefPicSetLtFoll subset includes long-term reference pictures that can be used to inter-predict pictures following the current picture in decoding order and not the current picture;

construct a plurality of reference picture supersets, wherein each of the reference picture supersets is a combination of two or more of the reference picture subsets;

construct an initial reference picture list, different than the plurality of reference picture supersets, based on one or more of the reference picture subsets;

set a current index into the initial reference picture list based on a coded starting position indicating a position at which to begin modification of the initial reference picture list;

determine a number of pictures to be inserted into the initial reference picture list;

determine a selected reference picture superset from the plurality of reference picture supersets based on decoding of information indicating the selected reference picture superset;

identify, based on the determined number of pictures, one or more reference pictures in the selected reference picture superset using one or more indices into the selected reference picture superset;

associate the identified reference pictures with respective indices of the initial reference picture list, including the current index, to construct the modified reference picture list; and decode the current picture of the video data based on the modified reference picture list.

* * * * *